US006934644B2

(12) United States Patent
Rogers et al.

(10) Patent No.: US 6,934,644 B2
(45) Date of Patent: Aug. 23, 2005

(54) METHOD AND APPARATUS FOR MONITORING OPERATIONAL PERFORMANCE OF FLUID STORAGE SYSTEMS

(75) Inventors: Warren F. Rogers, Newport, RI (US); John R. Collins, Punta Gorda, FL (US); Jillanne B. Jones, Narragansett, RI (US)

(73) Assignee: Warren Rogers Associates, Inc., Middletown, RI (US)

( * ) Notice: Subject to any disclaimer, the term of this patent is extended or adjusted under 35 U.S.C. 154(b) by 0 days.

(21) Appl. No.: 10/653,752

(22) Filed: Sep. 3, 2003

(65) Prior Publication Data

US 2004/0117135 A1 Jun. 17, 2004

Related U.S. Application Data

(63) Continuation-in-part of application No. 09/350,973, filed on Jul. 9, 1999, now Pat. No. 6,691,061, which is a continuation-in-part of application No. 09/083,732, filed on May 22, 1998, now Pat. No. 6,401,045, which is a continuation-in-part of application No. 08/658,139, filed on Jun. 4, 1996, now Pat. No. 5,757,664, and a continuation-in-part of application No. PCT/US97/09505, filed on Jun. 4, 1997.

(51) Int. Cl.[7] .............................................. G01F 17/00
(52) U.S. Cl. ......................... 702/55; 702/50; 702/33; 73/149; 73/290 R
(58) Field of Search ............................ 702/55, 50, 33; 73/149, 290 R

(56) References Cited

U.S. PATENT DOCUMENTS 3,579,218 A  5/1971  Forsythe, Jr.
3,811,598 A  5/1974  Schwarz
4,290,305 A  9/1981  Gibson et al.

(Continued)

FOREIGN PATENT DOCUMENTS

| EP | 03 10298 | 4/1989 |
|----|----------|--------|
| FR | 2 600 318 | 12/1987 |
| GB | 2124390 | 2/1984 |
| GB | 2138947 A | 10/1984 |
| WO | WO 97/46855 A1 | 12/1997 |

OTHER PUBLICATIONS

EP App. No. 009 45280.6–1260 Examination Report dated Jun. 24, 2003 Warren Rogers Assoc.

EP App. No. 00 945280.6–1260 Supplementary European Search Report dated Aug. 8, 2002 Warren Rogers Assoc.

PCT Written Opinion, PCT/US02/10096, dated Mar. 18, 2004 Warren Rogers Assoc.

(Continued)

*Primary Examiner*—John Barlow
*Assistant Examiner*—Anthony T. Dougherty
(74) *Attorney, Agent, or Firm*—Kirkpatrick & Lockhart Nicholson Graham LLP

(57) ABSTRACT

A method of determining a volume of fluid associated with a fluid storage and dispensing system, the volume of fluid having a height in the system, wherein the system include measurement apparatus for measuring the height. The method includes collecting a plurality of height measurement data from the measurement apparatus in a form readable by a computer; storing the plurality of height measurement data in a compressed matrix format in a computer memory; and performing regression analysis using the compressed matrix format to calculate the volume of fluid associated with the system.

6 Claims, 12 Drawing Sheets

U.S. PATENT DOCUMENTS

| | | | |
|---|---|---|---|
| 4,410,949 | A | | 10/1983 | Huellinghorst et al. |
| 4,796,676 | A | | 1/1989 | Hendershot et al. |
| 4,827,762 | A | | 5/1989 | Hasselmann |
| 4,835,699 | A | | 5/1989 | Mallard |
| 4,915,507 | A | | 4/1990 | Janotta |
| 4,977,528 | A | * | 12/1990 | Norris ......................... 702/100 |
| 5,047,101 | A | | 9/1991 | Trussler |
| 5,052,212 | A | | 10/1991 | Cohrs |
| 5,138,559 | A | | 8/1992 | Kuehl et al. |
| 5,184,504 | A | | 2/1993 | Spring |
| 5,265,032 | A | | 11/1993 | Patel |
| 5,288,367 | A | | 2/1994 | Angell et al. |
| 5,297,423 | A | * | 3/1994 | Keating et al. ............... 73/49.2 |
| 5,316,057 | A | | 5/1994 | Hasselmann |
| 5,317,899 | A | | 6/1994 | Hutchinson et al. |
| 5,351,725 | A | | 10/1994 | Suthergreen et al. |
| 5,359,522 | A | | 10/1994 | Ryan |
| 5,361,216 | A | | 11/1994 | Warn et al. |
| 5,363,093 | A | * | 11/1994 | Williams et al. ............ 340/605 |
| 5,371,495 | A | | 12/1994 | Sturges et al. |
| 5,375,455 | A | | 12/1994 | Maresca, Jr. et al. |
| 5,400,253 | A | | 3/1995 | O'Connor |
| 5,400,924 | A | | 3/1995 | Brodie |
| 5,402,427 | A | | 3/1995 | Parker |
| 5,423,457 | A | | 6/1995 | Nicholas et al. |
| 5,447,055 | A | | 9/1995 | Thompson et al. |
| 5,471,867 | A | | 12/1995 | Tuma et al. |
| 5,490,516 | A | | 2/1996 | Hutson |
| 5,528,516 | A | | 6/1996 | Yemini et al. |
| 5,530,439 | A | | 6/1996 | Steele et al. |
| 5,544,518 | A | * | 8/1996 | Hart et al. ................... 73/1.73 |
| 5,665,895 | A | | 9/1997 | Hart et al. |
| 5,686,658 | A | | 11/1997 | Boren |
| 5,757,664 | A | | 5/1998 | Rogers et al. |
| 5,857,501 | A | | 1/1999 | Kelerich et al. |
| 5,988,439 | A | | 11/1999 | Webb |
| 6,101,816 | A | | 8/2000 | Wang et al. |
| 6,401,045 | B1 | | 6/2002 | Rogers et al. |
| 2002/0049549 | A1 | | 4/2002 | Rogers et al. |

OTHER PUBLICATIONS

EPA Pub. No. 510–K–95–003, "Straight Talk on Tanks: Leak Detection Methods for Petroleum Underground Storage Tanks and Piping" (Jul. 1995).

William E Boyce and Richard C. DiPrima, "Elementary Differential Equations and Boundary Value Problems" Rensselaer Polytechnic Institute (Third Edition).

W. F. Rogers, "Volumetric Leak Detection–A Systems Perspective", ASTM STP 1161 (1992).

Ken Wilcox Assoc., Inc., "Evaluation of the Warren Roges Associates SIRA Statistical Inventory Reconciliation System (Version 5.2)" Final Report, Feb. 17, 1995, 19 pages.

EPA Pub. No. 510–B–95–009, "Introduction to Statistical Inventory Reconciliation," (Sept. 1995).

* cited by examiner $M := (XX^T \cdot XX)$    $N := (XX^T \cdot YY)$ $P := M + OX$    $Q := N + OY$ $\text{big}\beta := P^{-1} \cdot Q$ $\text{aug}X := X$ $\text{aug}X_{n,4} := 0$ $\text{aug}XX := XX$ $\text{aug}XX_{n,4} := 0$    $\text{newdels} := 0$ $\text{bdel} := 4..\text{rows}(\beta)$    $\text{newdels} := \text{if}(\text{rows}(\beta) > 3, \beta_{\text{bdel}}, 0)$ $\boxed{\text{non-scalar value}}$ $\text{TREND} := (\text{big}\beta_2) \cdot 60$ $\text{TREND2} := [(\text{big}\beta_4) \cdot 60] + \text{TREND}$

FIG. 2

$OX := READPRN(oldxtx)$    $OY := READPRN(oldxty)$    $OD := READPRN(olddeliveries)$ $od := 0$ $od := \sum_{j=1}^{rows(OD)} OD_j$ $YY_{1,1} := Y_{1,1} - od$ $YY_{n,1} := (Y_{n,1} - od) - if[(rows(Num\_Del) > 1), if[(Comp_{n,11}) > (Num\_Del_{n,1}), \beta_{h+\beta shift}, 0], 0]$ $XX_{1,1} := 1$ $XX_{n,1} := 1$ $XX_{1,2} := \left(\dfrac{Comp_{1,11}}{60}\right) \cdot (-1)$ $XX_{n,2} := \left(\dfrac{Comp_{n,11}}{60}\right) \cdot (-1)$ $XX_{1,3} := (Comp_{1,12}) \cdot (-1)$ $XX_{n,3} := (Comp_{n,12}) \cdot (-1)$ $XX_{1,4} := X_{1,2}$ $XX_{n,4} := X_{n,2}$

FIG. 3

$kxb := 15..15 + \text{Num\_Meters}$ $LR := \text{READPRN(lastrow)}$ $\text{Comp}_{1,b} := LR_b$ $cc := 2..\text{rows(Comp)}$ $\text{lostsales}_{kxb-14} := \text{if}\left[(\text{Gross}=1), \left[\frac{(\text{Comp}_{2,kxb}) \cdot (-1)}{\text{denom}}\right], \left[\frac{(\text{Comp}_{2,kxb}) \cdot (\text{Comp}_{1,kxb})}{\text{denom}}\right]\right] \cdot [1 + [(60 - \text{Comp}_{2,9}) \text{ ce}]]$ $\text{lsales} := \sum_{j=1}^{\text{Num\_Meters}} \text{lostsales}_j$ $\text{day} := [(\text{Comp}_{2,2}) \cdot (-1)] - [(\text{Comp}_{1,2}) \cdot (-1)]$ $\text{lhour} := (23 - \text{Comp}_{1,3}) \cdot 3600$ $\text{lmin} := (60 + \text{Comp}_{1,4}) \cdot 60$ $\text{nhour} := \text{Comp}_{2,3} \cdot 3600$ $\text{nmin} := [\text{Comp}_{2,4} \cdot (-1)] \cdot 60$ $\text{ltime} := \text{if}[\text{day} > 0, ((\text{day}-1) \cdot 86400) + \text{lhour} + \text{lmin} + \text{nhour} + \text{nmin}, \text{if}[\text{day}=0, [((\text{Comp}_{2,3} - \text{Comp}_{1,3}) \cdot 3600] + \text{lmin} + \text{nmin}, -9999]]$ $\text{Comp}_{cc,11} := \text{Comp}_{cc,11} + \text{Comp}_{1,11} + \text{ltime}$ $\text{Comp}_{cc,12} := \text{Comp}_{cc,12} + \text{Comp}_{1,12} + \text{lsales}$

FIG. 4

METHOD AND APPARATUS FOR MONITORING OPERATIONAL PERFORMANCE OF FLUID STORAGE SYSTEMS

CROSS-REFERENCE TO RBLATED APPLICATIONS

This application is a continuation-in-part of U.S. application Ser. No. 09/350,973, filed Jul. 9, 1999, now U.S. Pat. No. 6,691,061, which is a continuation-in-part of U.S. application Ser. No. 09/083,732, filed May 22, 1998, which issued on Jun. 4, 2002 as U.S. Pat. No. 6,401,045 B1, which in turn is a continuation-in-part of both U.S. application Ser. No. 08/658,139, filed Jun. 4, 1996, which issued on May 26, 1998 as U.S. Pat. No. 5,757,664 B1, and International Application No. PCT/US97/09505, which designated the United States and was filed on Jun. 4, 1997 and was published in English. The entire teachings of the above applications are incorporated herein by reference.

BACKGROUND

Description of the Background

The invention relates to monitoring the operational performance of fluid storage systems.

Large quantities of liquids and similar materials are often stored in bulk storage containers or tanks, which may be located above-ground, partially above-ground, or completely below ground. Such containers or tanks are generally connected by piping to flow-meters or dispensers.

For example, underground storage tanks (UST's) and, occasionally, above-ground storage tanks (AST's) are used to store petroleum products and fuel to be dispensed at automobile service stations, trucking terminals, automobile rental outlets, and similar operations through gasoline, diesel, or kerosene dispensing pumps. Fuel product is generally delivered to such facilities by a gravity drop from a compartment in a wheeled transport means such as a fuel delivery truck or an introduction of product through an underground piping system. AST's or UST's are often located at central distribution locations so that product can be subsequently withdrawn from the tank system to be transported for delivery to a variety of such facilities. A distribution location with UST's and AST's may receive deliveries of product from, e.g., a pipeline spur, wheeled transport, a barge, or a rail car.

Direct observation of the operating condition of such tanks and storage containers is difficult or impossible. The various methods for identifying the amount of product in tank systems have varying levels of accuracy, repeatability, and performance. Moreover, the accuracy of devices which measure the amount of product dispensed from the storage containers and tanks differs greatly, and may or may not be temperature compensated. The amount of product actually delivered to the tank system is often measured inaccurately and, frequently, not at all. Rather, the owner or operator of the tank or vessel usually records the invoiced amount of product delivered as the actual amount introduced to the tank system, without having any means of confirming whether the invoiced amount of product delivered is correct.

Consequently, effective management of such facilities is complicated by the numerous errors in the various measuring devices and procedures used to establish a baseline for management, planning and decision making. Effective management requires the following:

Accurate measurement of the volume stored in the system.

Accurate determination of the volume dispensed from the system.

Accurate determination of the amount of product introduced into the system.

Identification of volumes added to or removed from the tank system which are not otherwise recorded.

Rapid identification of leakage from the tank system.

Continuous monitoring and diagnosis of the operating performance of all of the component measuring devices of the system.

Continuous analysis of sales data to predict demands of product from the system.

Determination of optimal reorder times and quantities as a function to ordering, transportation, holding, and penalty costs in order to minimize total costs of operation and/or to maximize profits.

Traditionally, these functions were performed crudely, or, in many cases, not at all. Volume measurements were, and in many instances still are, based on imperfect knowledge of the geometry, dimensions, and configuration of the storage vessel. Also, dispensing meters are frequently miscalibrated. This is true even when tank systems are regulated, due to the breadth of tolerance permitted for individual sales as related to total tank volume. For example, deliveries from the delivery vehicle are almost always unmetered, additions of product from defueling vehicles are typically undocumented, and theft of the product is not uncommon.

Leakage of product, has in recent years, assumed a dimension far in excess of the mere loss of the product. Environmental damage can, and frequently does, expose the operator to very large liabilities from third party litigation in addition to U.S. Environmental Protection Agency (EPA)-mandated remediation which can cost in the range of hundreds of thousands of dollars. The EPA's requirements for leak detection are set forth in EPA Pub. No. 510-K-95-003, *Straight Talk on Tanks: Leak Detection Methods For Petroleum Underground Storage Tanks and Piping* (July 1991), which is incorporated herein by reference.

To address these concerns, Statistical Inventory Reconciliation (SIR) was developed. The SIR method consists of a computer-based procedure which identifies all of the sources of error noted above by statistical analysis of the various and unique patterns that are introduced into the inventory data and, in particular, into the cumulative variances in the data when viewed as functions of product height, sales volume, and time.

SUMMARY OF THE INVENTION

An embodiment of the present invention relates to a method of determining a volume of fluid associated with a fluid storage and dispensing system, the volume of fluid having a height in the system, wherein the system include measurement apparatus for measuring the height. The method includes collecting a plurality of height measurement data from the measurement apparatus in a form readable by a computer; storing the plurality of height measurement data in a compressed matrix format in a computer memory; and performing regression analysis using the compressed matrix format to calculate the volume of fluid associated with the system.

DESCRIPTION OF THE DRAWINGS

FIGS. 2, 3 and 4 are a portion of the Mathcad computer code used to perform the data compression algorithm.

DESCRIPTION OF THE PREFERRED EMBODIMENTS

The method and apparatus described herein applies to UST's, AST's or any type of storage tank. The product stored in the tank may be any fluid, including dry particles that flow in the manner of a fluid.

Figure 1:
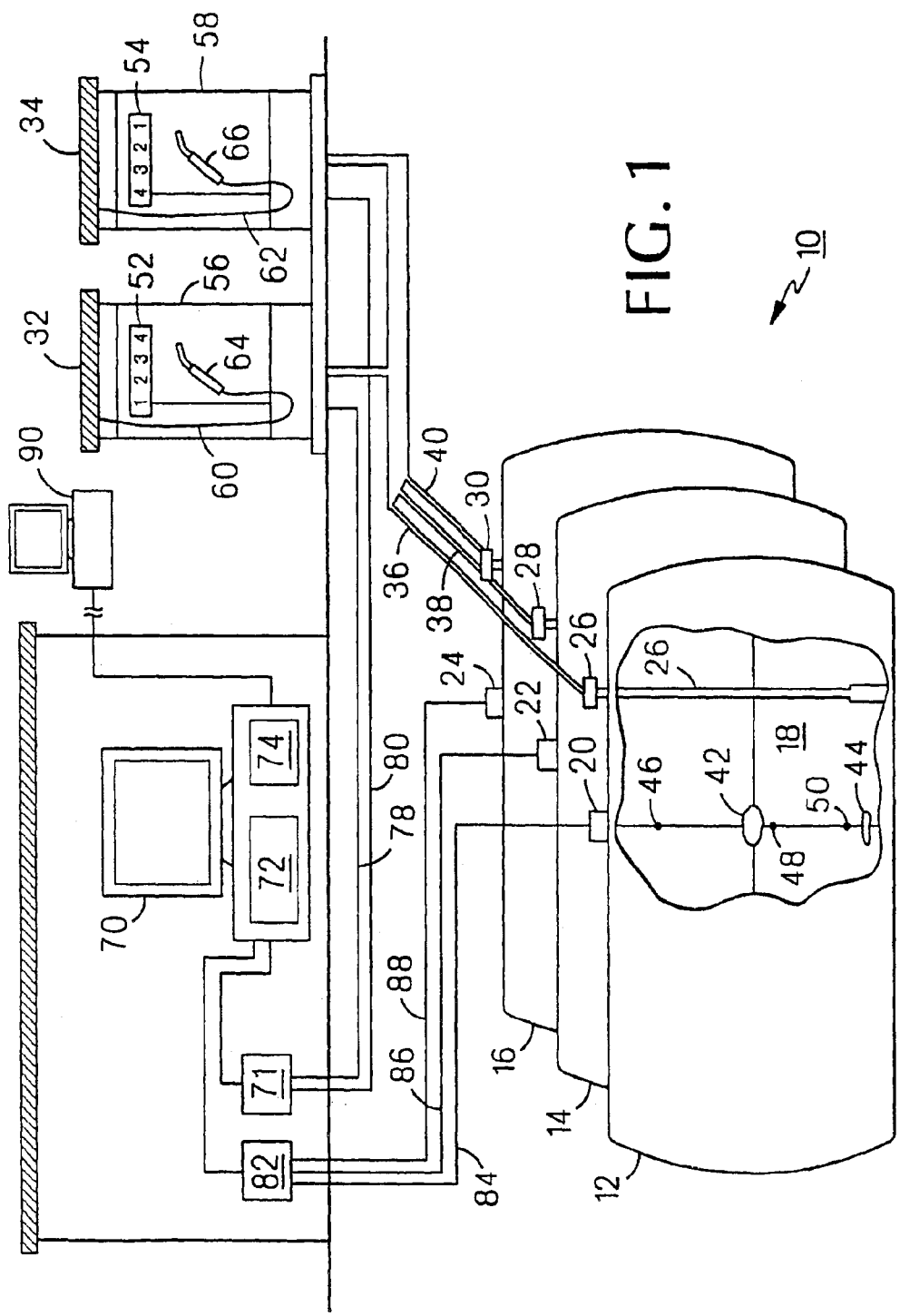
FIG. 1 is a schematic diagram of a facility including an underground tank storage system.
Figure 11:
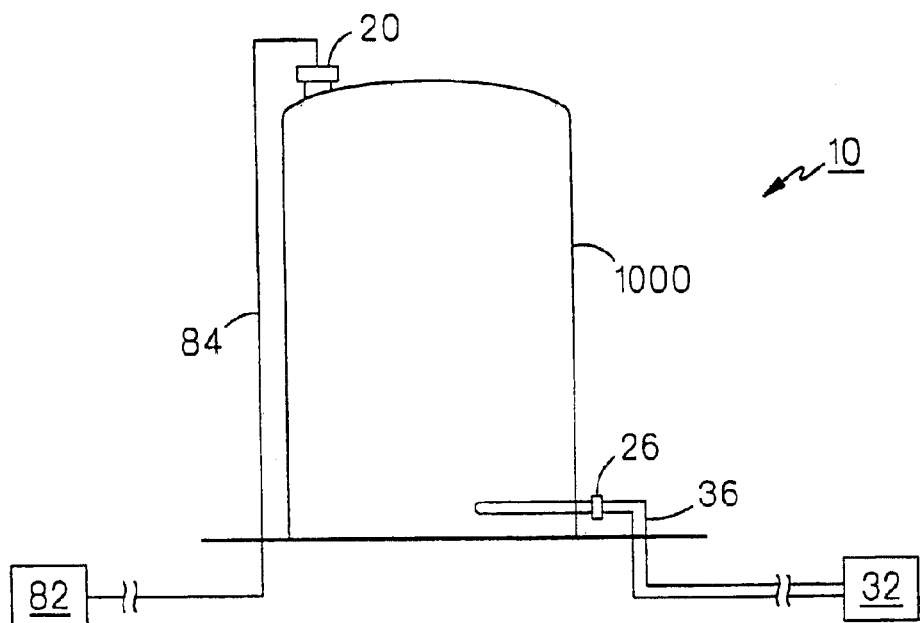
FIG. 11 is a schematic diagram of a facility including an above-ground tank storage system.
Figure 12:
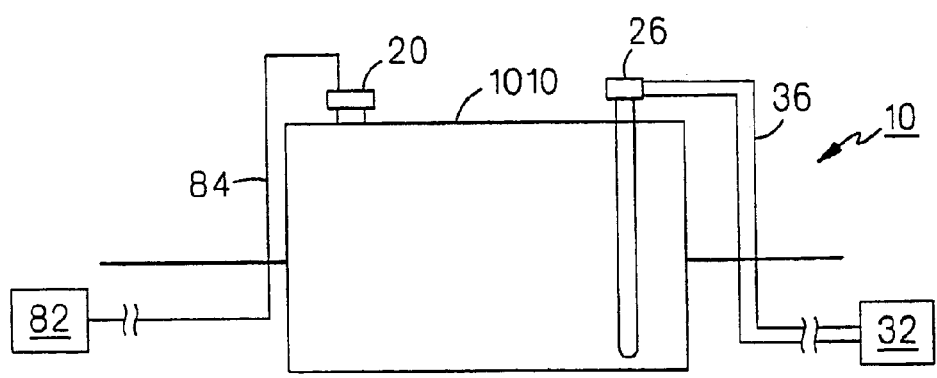
FIG. 12 is a schematic diagram of a facility including a partially above-ground tank storage system.

FIG. 1 shows a UST facility 10, illustrated as an automobile service station. Facility 10 includes a series of UST's 12, 14, 16 which may store the same or different types of liquid fuel product 18. Volumetric tank gauges 20, 22, 24 in each tank measure the height of product 18 in the tank. Submersible pumps 26, 28, 30 in each tank pump product 18 to one of dispensing pumps 32, 34 through piping lines 36, 38, 40. Alternately, facility 10 may be an AST facility with above-ground tank 1000, as shown in FIG. 11, or a facility with a partially above-ground tank 1010, as shown in FIG. 12.

Tank gauges 20, 22, 24 are mounted in tanks 12, 14, 16. The tank gauges may consist of or be based on magnetostrictive tank probes or other sensing technologies. In the cases of magnetostrictive technology, two floats 42, 44 surround each probe, e.g., gauge 20 in tank 12. One float 42 floats on the upper surface of product 18 in tank 12, and the other float 44 floats on the interface of product 18 with any water or other foreign material collected at the bottom of tank 12. Tank gauge 20 determines the distance between floats 42, 44 to obtain the height of product 18 in tank 12. Tank gauge 20 also contains temperature sensors 46, 48, 50 spaced along its length to monitor the temperature of produce 18 at various depth levels.

Each of the dispensing pumps 32, 34 consists of a totalizer or flow meter 52, 54 disposed in a housing 56, 58 to measure the volume of product 18 dispensed through hoses 60, 62 and nozzles 64, 66. To operate dispensing pump 32, nozzle 64 is removed from housing 56, which actuates dispensing pump 32 and causes product 18 to flow through hose 60 due to the pumping action of submersible pumps, 26, 28, 30. A value stored in totalizer 52 is incremented as fuel is dispensed through hose 60. Upon completion of the transaction, nozzle 64 is replaced in housing 56, thereby turning off dispensing pump 32 and discontinuing the action of submersible pumps 26, 28, 30 and totalizer 52.

Transactions are recorded electronically by software in a sales recording device 71 connected to totalizers 52, 54 of dispensing pumps 32, 34. Totalizers 52, 54 in dispensing pumps 32, 34 are connected to sales recording device 71 by means of communications and power supply wires 78, 80.

Sales recording device 71 contains software capable of emulating the functions of a point of sale (POS) terminal associated with fuel sales made at facility 10. POS emulation software in sales recording device 71 functions on the basis of read only commands to eliminate the possibility of conflict with control commands from a POS terminal employed by facility 10. Alternative data acquisition systems can result in destruction of credit card sales records, inadvertently shutting down the entire system, and/or causing electrical interference in the pump links.

Tank gauges 20, 22, 24 are connected to a tank monitor 82 by means of communications and power supply wires 84, 86, 88 or communicate data through radio frequency transmission. Tank monitor 82 converts raw data obtained from tank gauges 20, 22, 24 into a form usable by a computer.

A computer 70 contains a processor 72 capable of running various computer software applications and a memory 74. Tank monitor 82 and sales recording device 71 are electrically connected to computer 70 to relay totalizer values, product height and temperature data to computer 70. Software executable by processor 72 of computer 70 is capable of querying tank monitor 82 and sales recording device 71 to obtain measurement data at selected time intervals. The data is continuously evaluated as it is collected and is stored in memory 74 of computer 70 for later retrieval and detailed analysis. Alternatively, computer 70 may communicate with a host processor 90 at a remote location. The continuous evaluations or detailed analysis may then be performed by host processor 90, which may be faster or more efficient than computer 70.

As an example, computer 70 may be a personal computer or any other proprietary microprocessor-based unit. Computer 70 may capture data automatically through direct-connect serial interfaces or other data carrying transmission with tank monitor 82 and sales recording device 71, or by manual operator keypad entry. According to an embodiment, computer 70 communicates with equipment at facility 10 through four programmable serial communication ports, such as RS-232 communication ports. According to other embodiments, computer 70 may capture data wirelessly through, for example, PCS, cellular, Bluetooth, 802.11, WiFi, Infrared, radio frequency, or other technology.

Computer 70 may, e.g., store tank dimensions and product characteristics, and concurrent time and date data along with the measurement data. Computer 70 may be used to produce error and analysis reports as calculated by the software. It may also have alarm event-initiated capabilities, such as when a leak is detected in any of the tanks. Such a computer system can accommodate facility and customer specific requirements while maintaining complete compatibility with other system components.

The SIR method involves reconciling volume data obtained from tank monitor 82 and volume data obtained from sales records. Sales transactions may be detected in a number of ways, including an electronic signal emitted from totalizers 52, 54, by voltage sensing of control relays on pump dispensers 32, 34, or by observation of product removal using tank gauges 20, 22, 24.

It is essential that the measurements used to obtain these two types of data are made simultaneously. The SIR method of the present invention collects and analyzes observations of sales volumes and tank volumes which are derived simultaneously. Failure to collect both types of data simultaneously would bias estimates derived from separate volume measurements.

The SIR method properly accounts for the effects of temperature, pressure and specific gravity. In addition, product from two or more tanks may be blended, such as to achieve varying petroleum octane levels at pump dispensers 32, 34. When different fluid products are blended, the tanks are treated as one unit, and an additional parameter is introduced to determine the actual blend percentages.

Data concerning the physical characteristics of the tank configurations and the accuracy of the various gauges and metering devices is collected during the installation and a set-up phase of operation of facility 10 to create a basis for subsequent statistical analysis. Information is then continuously collected so that the statistical analysis of SIR can be performed by computer 70 or host processor 90.

Several procedures are used either singly or in combination to obtain the volume observations. First, where the system configuration provides for determining whether hoses and dispensers associated with a given tank are active, the system is queried on a minute-by-minute basis, or on the basis of another predetermined time interval, to determine the status of the dispensers. When all of the dispensers are idle, the values from totalizers 52, 54, the tank volumes (i.e. product heights in the tanks) and temperatures are recorded.

Second, submersible pumps 26, 28, 30 are checked to determine on/off status. When is it determined that the pumps are turned off, the values from totalizers 52, 54 are read, and tank volumes and temperatures are recorded.

Third, software algorithms used by computer 70 detect and measure leads and/or lags between the recording of sales events and corresponding gauge and meter readings. When leads or lags are encountered and constitute a physical characteristic of the data measurement and recording system, constrained optimization, rather than unconstrained optimization, may be used to determine parameter estimates. Lagrange multipliers are one example of such a constrained optimization method.

The method of the present invention is capable of providing dynamic monitoring of system performance. For example, the leak detection function is carried out continuously while normal operations, e.g., removals and deliveries, are taking place. To detect leaks dynamically, the software is programmed to detect when sales or delivery events occur and to calculate the volumes of product removed or added as a result of such activities. Thus, dynamic testing does not require that the system be dormant and addresses the entire system from the point of filling to the point of dispensing.

The SIR method of the present invention also distinguishes between one-time removals and continuous losses consistent with leakage. The integrity or leak-free status of the system is not assumed a priori. Instead, the individual and unique characteristic pattern induced by each form of error when viewed along the separate dimensions of time, product height and sales volume are used to identify and quantify the errors. The method may also be used to detect and quantify undocumented removals, e.g., theft or additions of product.

Further, the overall system is self diagnosing in that it determines from the data the maximum degrees of reliability and precision of which a particular operating configuration is capable at any given time, as well as the degree of calibration accuracy.

In particular, product height in the tanks and temperature are measured continuously at, e.g., one-minute intervals. Height and gross volumes are converted to net volumes at, e.g., 60° F. or 15° C., using the algorithms described below. Sales recorded by the totalizers 52, 54 are extracted and stored in memory 74 at times coincident with readings from tank gauges 20, 22, 24. If the dispensing system is capable of transmitting a signal indicating whether or not any or all individual hoses are active, that information is also stored in memory 74 coincident with taking gauge and meter readings.

The method of the present invention is designed to achieve the maximum accuracy possible within the limitations imposed by the inherent random and irreducible noise in the various measuring devices incorporated. It utilizes multiple measurements over extended time periods to identify and quantify systematic and repeatable effects in the instrumentation and thereby correct for such effects using the known physical characteristics of the devices. The system makes no a priori assumptions as to the accuracy of the devices used to measure product volume in the tank, to measure volumes removed, or as to the accuracy of volumes reported to have been delivered into the system.

The resulting volumetric calculations are independent of the physical characteristics of the tank configuration and the various measuring devices which may be incorporated into the system. The results do not rely on input entered externally by the operator or from diagnostics internal to the measuring devices used. Instead, the output produced by the software which analyzes the measured data depends only on the patterns induced in inventory data produced by the tank gauges and measuring devices and, in particular, the cumulative variances that result when the various input values are combined.

Various error patterns which the measuring devices can induce and the effects of temperature, tank geometry, and orientation on cumulative variances are derived from empirical analysis of real-world inventory data. The system's software synthesizes the output measurements of the various devices based on known characteristics derived from the empirical data. Thus, the software is capable of identifying measurement errors caused by the measuring devices and simultaneously compensating for the effects of those errors.

Gauges can be systematically inaccurate in two ways. The height of the product in the tank can be incorrect, and the height to volume conversion algorithms may not reflect accurately the true dimensions of the tank or its orientation in the ground. The latter may be the result of incorrect measurements or an inappropriate conversion algorithm.

The presence of such systematic effects and their nature may be established by examining the pattern of inventory variances as a function of product height. Errors of this kind induce patterns which repeat themselves as the tank is filled and emptied. If the tank length is incorrect, a linear pattern is induced. If product height is in error, a curvilinear pattern results reflecting the varying volumes in different cross sections of a cylindrical tank. Tilt along the length of the tank induces a sinusoidal pattern symmetrical about the mid-height of the tank. Absent such errors, the pattern will be purely random, reflecting only the inherent noise of the measuring devices. The absence of randomness and the presence of a systematic pattern serves to identify the presence of systematic error. The pattern of a departure from random and its extent determines the source and extent of the systematic effects and the means necessary to correct them.

Dispensing errors, unlike volume measuring errors, are independent of product height, but are sensitive to the volume of product dispensed. The nature and extent of dispensing errors can be established by examining inventory variances as a function of sales volume. As in the case of volume measurements, in the absence of systematic errors, variances as a function of sales volume will be random. The form and extent of departures from randomness serve to determine the source and extent of the errors and provide for their removal.

Leakage from the system creates a continuous downward trend in the cumulative variance when viewed as a function of time. By contrast, one-time additions and removals of product cause significant upward or downward translations of the cumulative variance which remain permanently in the record and do not introduce a continuous trend. Leakage is distinguishable from tank gauging errors when viewed as a function of product height because the pattern does not repeat as the tank is filled and emptied. If product is leaking from the system, a series of parallel translations in the cumulative variance is generated, each shifted by the volume of product lost between deliveries.

The accuracy of measurements taken from the various components of the system determines the accuracy achievable in any one individual observation. Since the leak rate is computed from a series of successive observations, however, the minimum detectable leak rate can be reduced to any desired magnitude by increasing the number of successive observations recorded. Thus, the system can serve as a final verification for leakage indications obtained by other methods.

At the conclusion of an initial set up period of data collection including one or more delivery and sales cycles, the collected measurement data is analyzed by regression analysis. The initial set-up regression is used to derive tank dimensions and orientation, individual meter calibrations and secular trends. A confidence level value p is computed at the 0.01 level of significance to determine the minimum leak rate detectable by the system, and the residual variance is computed to provide the current noise level of the system.

The regression is performed according to the following equation:

$$st_i(R, L, T) = a - \sum_{j=1}^{i}\sum_{k=1}^{n} \alpha_k sa_{kj} + \sum_{j=1}^{i} D_j - Et_i L_s + \sum_{j=1}^{m} B_j I_{ij}$$

where:
- $st_i(R,L,T)$=Volume in gallons derived from the ith gauge reading in inches in a cylindrical tank with or without hemispherical end caps with radius R, length L, and tilt over its length of T inches.
- a=Initial inventory in gallons, which is to be estimated.
- $Sa_{kj}$=Sales volume recorded on the kth totalizer.
- $\alpha_k$=Fraction of sales volume recorded on the kth totalizer actually removed from the tank, which is to be estimated.
- $D_j$=Volume of the jth delivery.
- $Et_i$=Elapsed time since initiation until the ith gauge reading is recorded.
- $L_s$=Constant gain or loss in product per unit of time.
- $B_j$=Volume of product added (e.g. delivery) or removed during some discrete time interval prior to or during observation period j.

$$I_{ij} = \begin{cases} 0 & \text{if } j < i \\ 1 & \text{if } j \geq i \end{cases}$$

All of the parameters are estimated simultaneously using least square estimation procedures. The R and T parameters are derived numerically, but the other parameters are derived analytically.

Further, all of the parameters, including the initial inventory, are estimated simultaneously. The initial volume must be estimated from all succeeding data, even if the tank is initially empty, otherwise the initial gauge reading and its conversion to gallons is assigned a credibility not assumed for all succeeding readings. Also, in a great majority of applications, the initial inventory in an already existing and operating system is not accurately known.

Initial inventory estimation is vital in determining the geometry of the tank. When tank geometry, tank orientation, or tank product height measurement depart from the values obtained from nominal sources, all gauge and meter measurements are affected. It is practically impossible to detect the errors induced in the gauge measurements and correct for them unless the estimation of the initial inventory is made coincident with the estimation of the values of the other parameters.

The estimate of the parameters are based on the totality of the data collected. This means, e.g., that the estimate of leak rate Ls is determined from a linear trend including all of the data collected, not merely at one end of the reconciliation period. Likewise, estimates of tank dimensions and orientation are derived from their overall contribution to reduction in residual variance, as opposed to a sale by sale analysis of tank segments.

The volume $st_i$ (R,L,T) is derived from the product height measurement by multiplying the constant area of tank segments of height h (in inches) by tank length L. The volume in gallons of product in a horizontal cylindrical tank of radius R is given by:

$$Vol = \frac{L}{231}\left[R^2 \cos^{-1}\left(\frac{R-h}{R}\right) - (R-h)(2Rh-h^2)^{1/2}\right]$$

In the case of a tilted tank, the area of the segments varies with position along the length of the titled tank, and the volume is determined by integrating over the length L. Such integration does not result in a closed form because the cross sections are not circular, and a numerical integration would severely limit the frequency of observations. Instead, in this application the tank is treated as lying horizontally and the product is considered tilted, to derive an equivalent volume. This integration yields the closed form:

$$Vol = \frac{R^3}{231}\left[(z-1)\sin^{-1}(2z-z^2)^{\frac{1}{2}} - \frac{1}{3}(2z-z^2)^{\frac{3}{2}}\right]_{hu/R}^{hu/R}$$

The integrand is evaluated between the normalized product heights in inches, hu/R and hl/R, at the lower and higher ends of the tilted tank, respectively. It is standard industry practice to install tanks on an incline to divert water and sludge away from the submersible pumps.

Tank tilt is identified from the pattern it induces in the record of cumulative variances as a function of product height. It is compensated for by fitting the correct mathematical form for height and volume conversions in a titled tank to the cumulative variance calculated by the method of least squares. This is done simultaneously with estimation of the initial inventory.

Tank length L and radius R are established by equating the first partial derivatives of the sum of squared cumulative variance with respect to length and radius and determining the values which minimize the sum of squared variances. Simultaneous estimation of initial inventory is also required when estimating tank length L and radius R.

Errors in measurement of the product height h in the tank are characterized by curvilinear patterns induced by height to volume conversions in the cumulative variance for a cylindrical container when heights are transposed upward or downward. Such errors also are compensated for by minimizing the sum of squared cumulative variances with respect to increments or decrements to measured product height. This estimation also requires simultaneous estimation of the initial inventory of the tank.

In general, the accuracy of the estimates of the tank dimensions, tank orientation and height measurements is confirmed by observing that the cumulative variances of each derived value as a function of nominal product height are random and display no systematic influence or effects.

Dispenser totalizer calibration is continuously monitored and evaluated by minimizing the sum of squared cumulative variances with respect to multiplicative constants associated with individual reported cumulative sales volumes from all pump dispensers associated with a particular tank system. This eliminates the need for manual verification of meter calibration.

In particular, gauge performance is continuously monitored to identify gauge malfunctions or degradation in gauge performance. Monitoring of gauge performance is independent of diagnostics which are internal to the measuring device. Diagnoses of problems are based only on their impact on the cumulative inventory variances which are continuously monitored by the software.

If the gauge fails to record changes in product height when the dispensers register sales, an increase in cumulative variances approximately equal to sales volume is observed; this effect can be identified by the monitoring software and a warning of gauge malfunction generated to the operator.

However, observation of the gauge registering product height change, but with a time lag after sales are recorded, may be a feature of normal gauge performance. Such normal gauge performance is identified by repeated positive increments in cumulative variances as sales are completed with subsequent return of the cumulative variance to normal bounds. When such gauge function is determined to be the normal operating characteristic of a particular system, constrained optimization with lagged variables is introduced into the software. Otherwise, the gauge's performance is reported as a malfunction.

Finally, temperatures in the tank are monitored to detect changes that are excessive for the time intervals between observations. Erratic temperature readings are deleted, and may indicate gauge malfunction.

The software computes actual, rather than nominal, delivered quantities and requires no input by the system operator. The operator may choose to input into the system the nominal delivery quantity indicated by the delivery invoice, along with the temperature and coefficient of expansion of the product at the point of pick-up. The software will then compute overages or shortages between the nominal and actual quantities delivered, as well as the overages or shortages caused by temperature-induced variations in the transport of the product to the facility and in the subsequent mixing of the delivered product with that resident in the tank.

Delivery is identified by the software when a positive cumulative variance is observed which exceeds the system noise level and is not succeeded by a return to normal variance bounds. Delivered quantities are computed by estimating the volume increases they induce in multiple successive observations. The required number of successive observations is determined as that sufficient to generate a confidence width which is within a predetermined tolerance.

The system of the present invention is capable of accounting for sales conducted during delivery and for noise introduced by post delivery turbulence in the tank.

One-time unaccounted for removals or additions to the tank are computed in the same manner. Deliveries are distinguished from such events by computing the rate of input, which in the case of normal gravity delivery should exceed 100 gallons per minute. Other modes of delivery, e.g., pipeline delivery into above ground tanks, are identified by incorporating their known delivery rates.

Leakage from the system is identified by a continuous linear negative trend in the data which exceeds the computed minimum detectable leak rate after all of the various error phenomena described above have been identified and compensated for. This calculation deals with the totality of the data obtained by constantly monitoring known removals and is not restricted to observations made only when the system is dormant. It is also independent of any single data reconciliation calculation in that trends throughout all of the data are evaluated.

All calculations concerning volumes are made on the basis of net volume, according to the following definitions:

Net Volume in Tank=Gauge Volume$(1-(t-60)CE)$ where:

t=Measured temperature in degrees Fahrenheit (if centigrade, the term in parentheses becomes (t-15)).

CE=Coefficient of expansion and

Net Sales Volume=Metered Sale$(1-(0.5(t_1+t_2)-60)CE)$ where $t_1$ and $t_2$ temperatures measured by the tank gauge at the beginning and ending of a sale transaction, respectively. Deliveries are computed in net gallons, but are converted to gross quantities if required, based on external information input by the system operator, as follows:

GT=Gross gallons on invoice at the originating terminal.

NT=Net gallons on invoice at the terminal.

tT=Temperature at the terminal.

CE=Coefficient of expansion.

The program also records:

tA=Ambient temperature in the tank prior to delivery.

tF=Temperature in the tank at the conclusion of delivery.

The following value is computed:

$$tS = \text{Temperature of the product in the delivery vehicle at the facility at the beginning of the delivery.}$$

$$= tF + \frac{NVA}{NVD}(tF - tA)$$

where:

$NVD$ = Actual net volume delivered, previously computed.

$NVA$ = Net volume in the storage tank at the start of delivery.

$NS$ = Net overage (+) (underage (−)) in delivery.

$= NT - NVD$.

$GVD$ = Gross volume delivered $= NVD\,(1 + (tF - 60)\,CE)$

-continued $GVS$ = Gross volume in the transport vehicle at the facility prior to delivery.

= $NVD (1 + (tS - 60) CE)$ $GSM$ = Shrinkage due to mixing in the tank.

= $GVS - GVD$ $GVT$ = Actual gross volume in the transport vehicle at the facility.

= $NVD (1 + (tT - 60) CE)$ $GST$ = Shrinkage during transit to the facility.

= $GVT - GVS$ $GOS$ = Gross over (+) (underage (−)) adjusted for temperature effects.

= $GT - GVD + GST + GMS$

Calculations of volumes actually delivered are based on multiple observations of the balance of measured tank volumes and cumulative sales. This method requires frequent simultaneous observations of sales and in-tank volumes (i.e. product heights) and temperatures.

The volume of product in a tank is derived by measuring the height of the product and using the geometry of the tank, which is assumed to be known, to compute the corresponding volume. In many instances, tank dimensions vary substantially from assumed design dimensions. Regulatory specifications permit up to 10% variation in length and diameter of cylindrical tanks.

Tank orientation can also cause complications in the calculations. The volume corresponding to a measured height varies substantially when the tank is tilted away from horizontal or rolled away from vertical.

Further, tanks may also fail to conform to a known geometry either through faulty manufacture or installation, or may suffer significant deformation during the course of operations. For example, many fiberglass tanks sag or bend along their length.

In addition, installed tanks are typically inaccessible, and difficult to measure. Thus, it is necessary to confirm the accuracy of height to volume conversions from generated inventory data and to identify and correct discrepancies where they exist.

The foregoing problems are compounded when two or more tanks are manifolded together. Manifolded tanks are joined together by piping systems and serve common dispensers. Thus, sales quantities for manifolded tanks constitute withdrawals from all tanks in the manifolded system, but not necessarily in equal quantities. Product heights typically vary from tank to tank, but tank geometries, dimensions and orientation may also vary so that a procedure for correcting height to volume conversion errors for a single tank will not apply.

The different factors which influence inventory data manifest themselves in distinct ways which facilitate their identification and correction. These factors are most easily identified by examination of their effects on cumulative departures of actual measured inventory from a theoretical or book value when viewed across a variety of dimensions. In particular, one-time undocumented physical additions or removals of product, e.g. over or under deliveries and pilferage, are evidenced by an addition or subtraction of a constant quantity from the cumulative variance at the time of occurrence and all subsequent observations. Continuous loss of product accumulating over time, e.g. leakage, is evidenced by a loss trend over time. Continuous loss of product varying proportionally with sales value, such as a line leak or meter miscalibration, may be determined by identifying a constant negative trend that is cumulative only over periods where delivery lines are pressurized.

A pattern of gains or losses, or both, recurring cyclically as the tank is successively filled and emptied with no long term gain or loss of product, is the pattern associated with height to volume conversion error. The pattern is cyclical because the error source is identical in each cycle as the tank is filled or emptied. It is distinguishable from the other patterns in that it retraces the same path without the translation which would occur if physical loss or gain of product were taking place.

This problem is most readily diagnosed by analyzing cumulative variance as a function of product height. If the variances are random with no evidence of systematic effects, height to volume conversions may be assumed to be correct. If not, the form of the induced pattern indicates the nature of the conversion error. Thus, an error in tank length induces a linear pattern, an error in tank tilt induces a sinusoidal pattern, and a constant error in tank height measurement induces an arc-like pattern. When other sources of loss or gain are present, the conversion error patterns remain, but are translated in each succeeding filling/emptying cycle to reflect the physical loss of product which has occurred during that cycle. Thus, confusion between conversion errors and other effects can be eliminated.

Sales readings and product height measurements must be made simultaneously. Since the number of observations in any one sales cycle is typically too few to generate a conversion table of sufficient detail to be of practical use, subsequent sales cycles and their corresponding deliveries must be incorporated. If, however, deliveries are unmetered and are used to approximate the volume (as is the standard industry practice), significant inconsistencies are introduced. If an overage or shortage occurs during delivery, then all subsequent sales volumes correspond to tank cross sections which have been shifted upward or downward from their predecessors. Averaging or statistical treatment cannot overcome this deficiency since there is no means of knowing without metering whether, by how much, and in what direction the data has been shifted.

The procedure of the present invention may include determining if height to volume conversion error is a problem. If the error is a problem, then the system must determine the nature of the problem, e.g. tank dimensions, tank orientation, height measurement or unknown tank geometry, and whether the conversion problem is compounded by other gains and losses. If leakage is suspected, an on-site leak detection investigation is undertaken. If no leakage is indicated, and one or all of tank dimensions, tank orientation and height measurement are problems, new conversion factors are calculated and confirmed using the diagnostic procedures described herein.

If unknown tank geometry or manifolded systems are encountered, the exact current percentage of metered sales actually dispensed from each dispenser is determined by physical measurement. A high order polynomial using a variable of measured product height is used to convert height to volume. The parameters of the polynomial are derived from the differences between measured product height corresponding to the beginning and ending of sales events which do not overlap deliveries.

For a single tank, actual dispensed quantities are regressed using a polynomial based on the differences in measured product height before and after individual sales, subject to the constraint that when the polynomial is evaluated at a height equal to tank diameter, the result is the total tank volume. Observations which include delivery events are discarded.

$$ASale_i = a_1(h_{i-1}-h_i) + a_2(h_{i-1}^2-h_i^2) + \ldots + a_n(h_{i-1}^n-h_i^n)$$

$$Vol = a_1 d + a_2 d^2 + \ldots + a_n d^n$$

A fifth order polynomial has proven adequate in most cases. Residual analysis may be used to determine adequacy of the polynomial in the presence of severe tank distortions, and higher order polynomials may be introduced as necessary. The number of observations required is determined by estimating a confidence bound around the resulting polynomial with a width adequate for the desired resolution. Thus, ASale$_i$=Actual dispensed volume in period i.

h$_i$=Product height upon conclusion of ASale$_i$.

h$_{i-1}$=Product height prior to commencement of Asale$_i$ and after completion of Asale$_{i-1}$.

d=Diameter of tank.

Vol=Total volume of tank.

The converted volume for height h is then given by:

$$Vol(h) = a_1 h + a_2 h^2 + \ldots + a_n h^n$$

The omission of a constant term in the regression implies that $$Vol(h)=0 \text{ when } h=0$$

This ensures that the polynomial derived from the height differences is well defined.

For manifolded systems, actual sales are regressed simultaneously on individual polynomials based on the various height differences in the several tanks which correspond to a particular sales volume, subject to the constraint that each polynomial evaluated at the corresponding tank diameter yields the total volume of that tank.

$$ASale_i = a_{11}(h_{i-11} - h_{i1}) + a_{21}(h_{i-11}^2 - h_{i1}^2) + \ldots +$$
$$a_{n1}(h_{i-11}^n - h_{i1}^n) +$$
$$a_{12}(h_{i-12} - h_{i2}) + a_{22}(h_{i-12}^2 - h_{i2}^2) + \ldots +$$
$$a_{n2}(h_{i-12}^n - h_{i2}^n) + \ldots +$$
$$a_{1m}(h_{i-1m} - h_{im}) + a_{2m}(h_{i-1m}^2 - h_{im}^2) + \ldots +$$
$$a_{nm}(h_{i-1m}^n - h_{im}^n)$$

where:

Asale$_i$=Actual Sales volume in period i.

h$_{i-1j}$=Height of product in tank j after completion of Asale$_{i-1}$ and prior to commencing Asale$_i$.

j=1,2, ... m h$_{ij}$=Height of product in tank j after completion of ASale$_i$.

m=Number of tanks manifolded.

Volume conversion or the m measured heights, h$_1$, h$_2$, ... h$_m$ in the total system is:

$$Vol(h_1, h_2, \ldots, h_m) = \sum_{i=1}^{m} \sum_{j=1}^{n} a_{ij} h_i^j$$

where:

h$_i$=Height of product measured in the ith tank in the manifold.

Delivery inaccuracies have no impact on this calculation since all observations made during deliveries are discarded. Height changes are related only to the corresponding volumes dispensed.

Prior determination of actual quantities dispensed, as opposed to metered quantities, ensures that the only remaining source of error is random measurement error. Regression is designed to accommodate random error of this kind to facilitate inferences when errors are present.

An alternative method of estimating volume of product based on product height in single or manifolded tanks involves determining a volume function by integrating a differential of the volume function. The total differential of the volume function is estimated using one of several procedures, e.g., least squares estimation. For example, for a manifolded system of storage tanks, if $$Sa_i = V(h_{1,i}, h_{2,i}, \ldots h_{m,i}) - V(h_{1,i+1}, h_{2,i+1}, \ldots, h_{m,i+1})$$

where $Sa_i$ is the measured volume change associated with measured changes in product height during a dispensing event from the manifolded tanks, then $$Sa_i = V(h_{1,1}, h_{2,2}, \ldots h_{m,1}) - V(h_{1,i+1}, h_{2,i+1}, \ldots, h_{m,i+1})$$
$$\approx V_1(h_{1,i}, h_{2,1}, \ldots, h_{m,1})(h_{1,j} - h_{1,i+1}) +$$
$$V(h_{1,i}, h_{2,i}, \ldots, h_{m,i})(h_{2,1} - h_{2,i+1}) + \ldots +$$
$$V_m(h_{1,i}, h_{2,i}, \ldots, h_{m,1})(h_{m,1} - h_{m,i+1}) +$$

where $V_j(h_{1,i}, \ldots, h_{m,i})$ is the partial derivative of the volume function with respect to $h_j$, the height of the fluid in the j$^{th}$ tank. The least squares technique provides maximum likelihood estimates because measurement errors occurring in tank gauges 20, 22, 24 have been established to be normally distributed.

A differential function for a volume function having any functional form may be estimated in this manner. For example, a high order polynomial may be used and constrained to have a preset volume at a maximum height, zero volume for zero height in all tanks and/or zero value of the first derivative at maximum height and at zero height.

For example, if h$_{ij}$=product height in tank i at the completion of sale j and prior to the start of sale j+1, Sa$_k$=volume dispensed in sale k, and the volume function is an r$^{th}$ order polynomial in the form $$Vol(h_1, h_2, \ldots, h_m) = \sum_{i=1}^{m} \sum_{j=2}^{r} a_{1,j} h^j$$

then $$Sa_k \approx \sum_{i=1}^{m} \sum_{j=1}^{r-1} (j+1) a_{ij} h_{ik}^j (h_{i,k-1} - h_{i,k})$$

where the linear term of the polynomial is omitted to provide a zero derivative at h=0. Then, the following equation may be minimized $$\sum_{k}\left(Sa_k - \sum_{i=1}^{m}\sum_{j=1}^{r-1}(j+1)a_{ij}h_{ik}^{j}(h_{i,k-1}-h_{i,k})\right)^2$$

subject to $$\sum_{j=1}^{r-1}(j+1)a_{ij}h\max_{ij}^{j}=0$$

and $$\sum_{j=1}^{r}a_{ij}h\max_{i}^{j}=Volmax_i$$

for i=1,2, ... , m where $hmax_i$ is the maximum product height in tank i, $Volmax_i$ is the preset maximum volume in tank i and m is the number of tanks in the manifolded system.

The foregoing equation works well for m=1. For m>1, a further constraint is required to ensure upward concavity of the individual volume functions near zero volume. This is accomplished by constraining the second partial derivatives of the individual volume functions to be positive at zero volume. In the case of polynomial functions and tanks with equal radii, this reduces to the constraint $a_{1,1}=a_{2,1}= \ldots =a_{m,1}$.

Alternatively, the volume function may take the form $$V(h) = \frac{e^{f(h)}}{1+e^{f(h)}}$$

where f(h) is a function of the height h. The derivative of V(h) is $$V'(h) = \frac{e^{f(h)}f'(h)}{(1+e^{f(h)})^2}$$

Numerical minimization may be used to estimate this derivative function. An advantage of a function in the form of V'(h) is that it asymptotically approaches zero (0) near h=0 and one (1) near the maximum height.

Determining the volume function by integrating an estimated derivative of the volume function has many advantages. For example, the data used to estimate the derivative consists of discrete measurements of dispensed volumes and corresponding product height changes, which avoids introducing ambiguities and errors due to inaccurate calculations of deliveries of the product. The data does not need to be sequential, and data for periods during deliveries and post delivery turbulence may be discarded. Because the only error sources are in the metering devices (for which calibration may be determined as described herein) and random errors of height measurement (the magnitude of which may be determined as described herein) the error resulting from the height to volume conversion may be contained within acceptable limits. Further, the volume function derivative may be estimated accurately because the system can collect a large number of data points, which may be stored in a compressed format as described below, and because the system avoids delivery calculation errors. As in the case of calculating the volume of product in a single tank, the sales, volume and tank height measurements must take place simultaneously, the calibration of individual meters must be monitored and recorded, and a large volume of data must be collected and recorded.

With respect to temperature, the temperature of product delivered into a tank system almost invariably differs from the temperature of the product already in the tank. Its addition has the effect of expanding or contracting the volume of the combined product. This change in volume can create the appearance of incorrect dimensions of the height to volume conversion, appear as leakage where none exists, or it can mask the existence of actual leakage.

It is therefore preferable, and frequently essential, that all volumes, sales, deliveries and product in storage be converted to a common temperature prior to analysis. Typically 60° F. (15° C.)) is chosen as the standard. The conversion is accomplished as follows:

Net Volume=Gross volume(1−(t−60)CE)

where:

t=Measured product temperature in degrees Fahrenheit

CE=Coefficient of expansion.

As above, all calculations are in net gallons of product.

A complication to the calculation may occur if the tank gauges 20, 22, 24 used to measure product volume are designed for static or dormant mode tank testing. Such tank gauges detect leakage when the tank is taken out of service. In this case, product volume changes due to temperature changes during the course of a test must be accounted for.

Further, as shown in FIG. 1, temperature sensors 46, 48, 50 are located at different heights in tank 12. If the level of product falls below a given temperature sensor, the corresponding weighted temperature measurement is dropped from the average temperature calculation, and a temperature jump and corresponding volume change may be observed when the net volume is calculated using the new weighted average of temperatures. If uncorrected, such repeated jumps in the data would preclude further analysis of the data for leak detection or the generation of height to volume conversions.

The system of the present invention may be used to overcome these temperature related problems. Using the following definition, $NDB_N$=The net cumulative variance in the inventory data at observation N.

then, $$NDB_N = a(1-(t_0-60)CE - \sum_{i=1}^{N}Sa_i(1-(t_i-60)CE) - V_N(1-(t_N-60)CE)$$

where a=Gross initial inventory.

$t_0$=Temperature of initial product volume.

$t_i$=Temperature of product at observation i.

$Sa_i$=Gross volume sold in period i.

$V_N$=Measured gross volume in tank at period N.

CE Coefficient of expansion.

Absent random error or leakage, and assuming no deliveries of product then $NDB_N \approx 0$ and $$a(1-(t_0-60)CE - \sum_{i=1}^{N} Sa_i(1-(t_i-60)CE) \approx V_N(1-(t_N-60)CE)$$

Therefore, if a temperature jump to temperature t* occurs at an observation N+1, then $$NDB_{N+1} = V_N(1-(t_N-60)CE) - Sa_{N+1}(1-(t^*-60)CE) -$$
$$V_{N+1}(1-(t^*-60)CE)$$
$$= V_N(1-(t_N-60)CE) - Sa_{N+1}(1-(t^*-60)CE) -$$
$$(V_N - Sa_{N+1})(1-(t^*-60)CE)$$
$$= V_N(t^*-t_N)CE$$

When this final quantity $NDB_{N+1}$ is added to the volume where the transition occurs between temperature sensors, and all subsequent volumes, the effect of the transition is eliminated, and analysis proceeds as it would where individual temperature readings are available.

A large number of variables must be estimated by the software to implement the SIR system of the present invention. For example, as many as forty hoses and independent totalizers per tank system, as well as deliveries numbering four or more per day must be accommodated. Thus, a very large volume of data must be accumulated, encompassing a substantial spread of sales volumes from each totalizer for both the set-up analysis and subsequent routine monitoring. To accommodate this volume of data within current or conceivable future practical computer memory capabilities, the algorithm implemented by the software utilizes a matrix formulation which invokes the property of a sufficient statistic to reduce the memory requirement.

The calculations used to determine the various error, loss trend and delivery estimate have the form:

$$B = (x^T x)^{-1} x^T y$$
$$MSE = \frac{(y-xB)^T(y-xB)}{m+1}$$
$$S^2 = (x^T x)^{-1} MSE$$

where:

B=column vector of m parameters to be estimated.
x=Matrix of parameter coefficients.
y=Column vector of independent variables.
MSE=Mean squared error.
$S^2$=Variance covariance matrix of parameter estimates.

The values contained in vector y comprise tank gauge readings. The entries, in matrix x are measured sales volumes, time, and other constant values. The parameters of vector B which are to be evaluated include the initial volume of the system and subsequent volume changes, including delivery amounts.

For example, if observations are recorded every minute, as many as 1440 rows in the x matrix and the y vector may be recorded. It would clearly be impractical to accumulate and store data in that form over an extended period of time. Instead, data compression techniques are applied so that only a manageable amount of data need be stored.

The algorithm utilizes the property that if an n x m matrix A is partitioned into two submatrices, B and C, where B is an i x m matrix and C is a j x m matrix, such that i+j=n, then $$C^T C = A^T A + B^T B$$

For example, $$\text{if } C = \begin{bmatrix} 1 & 2 \\ 1 & 2 \\ 2 & 1 \\ 1 & 2 \end{bmatrix} \text{ then } A = \begin{bmatrix} 1 & 2 \\ 1 & 2 \end{bmatrix} \text{ and } B = \begin{bmatrix} 2 & 1 \\ 1 & 2 \end{bmatrix}$$

$$A^T A = \begin{bmatrix} 1 & 1 \\ 2 & 2 \end{bmatrix} \begin{bmatrix} 1 & 2 \\ 1 & 2 \end{bmatrix} = \begin{bmatrix} 2 & 4 \\ 4 & 8 \end{bmatrix}$$

$$B^T B = \begin{bmatrix} 2 & 1 \\ 1 & 2 \end{bmatrix} \begin{bmatrix} 2 & 1 \\ 1 & 2 \end{bmatrix} = \begin{bmatrix} 5 & 4 \\ 4 & 5 \end{bmatrix}$$

Thus, $A^T A + B^T B = \begin{bmatrix} 7 & 8 \\ 8 & 13 \end{bmatrix}$ $$C^T C = \begin{bmatrix} 1 & 1 & 2 & 1 \\ 2 & 2 & 1 & 2 \end{bmatrix} \begin{bmatrix} 1 & 2 \\ 1 & 2 \\ 2 & 1 \\ 1 & 2 \end{bmatrix} = \begin{bmatrix} 7 & 8 \\ 8 & 13 \end{bmatrix}$$

At the conclusion of each 24 hour or other period, only $x^T x$ and $x^T y$ are computed and stored. The matrix x has the form of a square n x n matrix. Further, the aggregates of observations for the different periods are additive, since two square matrices having n x n dimensions may be added. Thus the total data storage requirement for each period is determined only by the square of the number of parameters of interest.

The system is able to accommodate virtually unlimited numbers of observations by this method of data compression. Without this capability, the system would not have the storage capacity to accurately and simultaneously estimate the numbers of parameters which are required to perform a statistically significant calculation. This data compression method also allows for processing the data at the facility or for transmitting the data to a host computer for periodic analysis. FIGS. 2, 3 and 4 show the Mathcad computer code used to perform the data compression algorithm.

Furthermore, $(x^T x)^{-1} x^T y$ is a complete and sufficient statistic for B. No statistically useful information is lost in the compression. The overall procedure is, therefore, unlimited by memory. The only limitation remaining is the precision available in the computer system used.

The software performs SIR analysis, including inventory estimation and leak detection, using the above equation in the following form:

$$x = \begin{bmatrix} 1_{range} \\ T_{range}(-1) \\ (-1)(-S_{range})^{<meters>} \end{bmatrix}$$

$$y = (Stk_{range}) - (CD_{range})$$

where:
range=1 . . . (number of observations)
meters=1 . . . (number of dispensers)
and
$1_{range}$=Column of 1's.
$T_{range}$=Cumulative time in minutes.
$(S_{range})^{<meters>}$=Cumulative sales for an individual dispenser in gallons.

$CD_{range}$=Cumulative deliveries.

$Stk_{range}$=Tank stick reading in gallons.

To estimate the initial inventory, the matrix x includes a column of unitary values. To estimate loss trends, the matrix x includes a column containing cumulative times of measurement and cumulative sales. The values of B, MSE and $S^2$ are then calculated, producing the following result for vector B:

$B_1$=Estimated initial inventory.

$B_2$=Loss trend.

$B_{2+meters}$=Individual meter error.

B is the vector containing the parameter estimates, namely beginning inventory, meter calibrations and loss rate. The loss rate estimate is in the second row (n=2). $S^2$ is the variance covariance matrix of the parameter estimates. Thus, $S_{22}=(S^2_{22})^{1/2}$ is the standard deviation of the loss rate estimate. Finally, the minimal detectable leak is defined as $t_\alpha S_{22}$, where $t_\alpha$ is the (1-$\alpha$) percentile of the Student's t distribution.

The software performs delivery calculations using the equation in the following form:

$$x = \begin{bmatrix} 1_{range} \\ T_{range}(-1) \\ (-1)(-S_{range})^{<meters>} \\ D_{range} \end{bmatrix}$$

$$y = (Stk_{range})$$

where:

range=1 . . . (number of records)

and $1_{range}$=Column of 1's $T_{range}$=Cumulative time in minutes.

$S_{range}$=Cumulative sales in gallons.

$D_{range}$=0 where $T_{range}$ is greater than or equal to delivery time and 1 where $T_{range}$ is greater than or equal to delivery time.

$Stk_{range}$=Tank stick reading in gallons.

The values of B, MSE and $S^2$ are then calculated, producing the following result for the vector B:

$B_1$=Estimated initial inventory.

$B_2$=Loss trend.

$B_3$=Meter error.

$B_4$=Estimated delivery amount.

$S^2$ is the variance covariance matrix of the estimates. Thus, $S_{44}=(S^2_{44})^{1/2}$ is the standard deviation of $B_4$, the delivery volume estimate. The delivery tolerance is $B_4 \pm t_\alpha S_{44}$, where $t_\alpha$ is the (1-$\alpha$) percentile of the Student's t distribution. Delivery tolerances can be reduced to any desired value by increasing the number of observations used in the calculation.

The SIR analysis used by the method of the present invention involves computing and comparing cumulative variances. When the initial set-up is complete, computed trend and meter calibrations are used to project forward an expected cumulative variance, that is, the expected value of the difference between gauge readings and computed inventory. Actual cumulative variances are then computed from all subsequent gauge and meter readings and compared to the expected variance.

Figure 5:
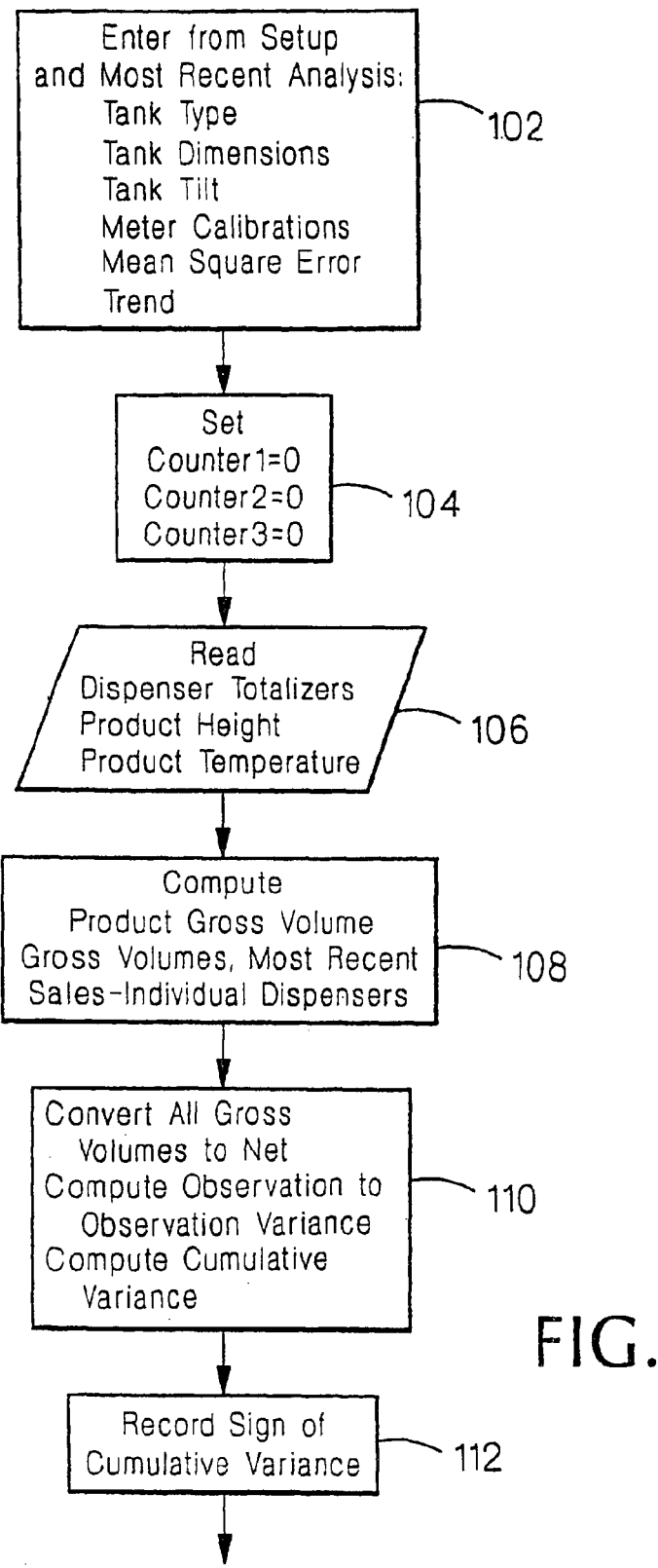
FIGS. 5, 6 and 7 are a block diagram of the steps performed during routine operation of the algorithm of the present invention.
Figure 6:
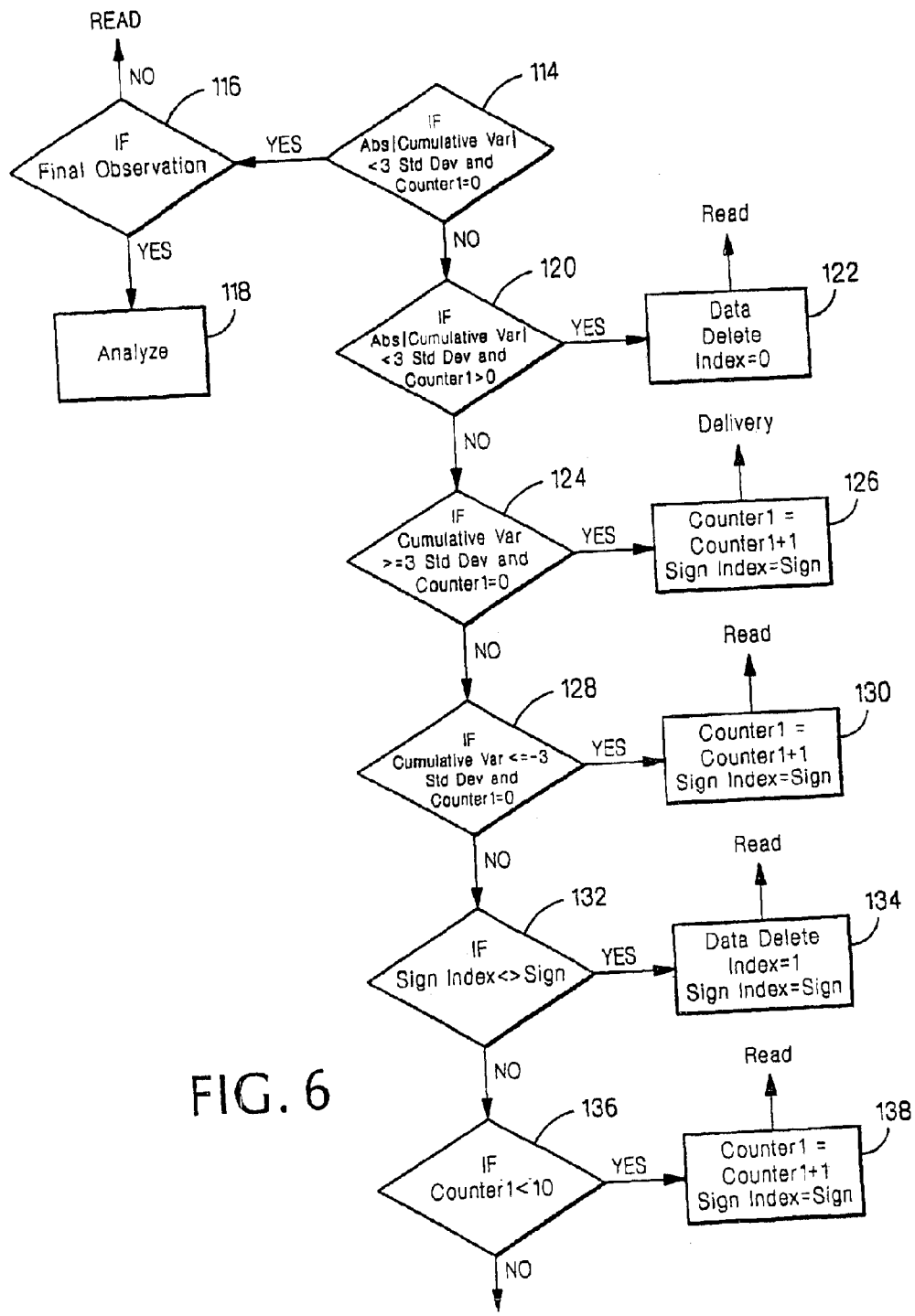
Figure 7:
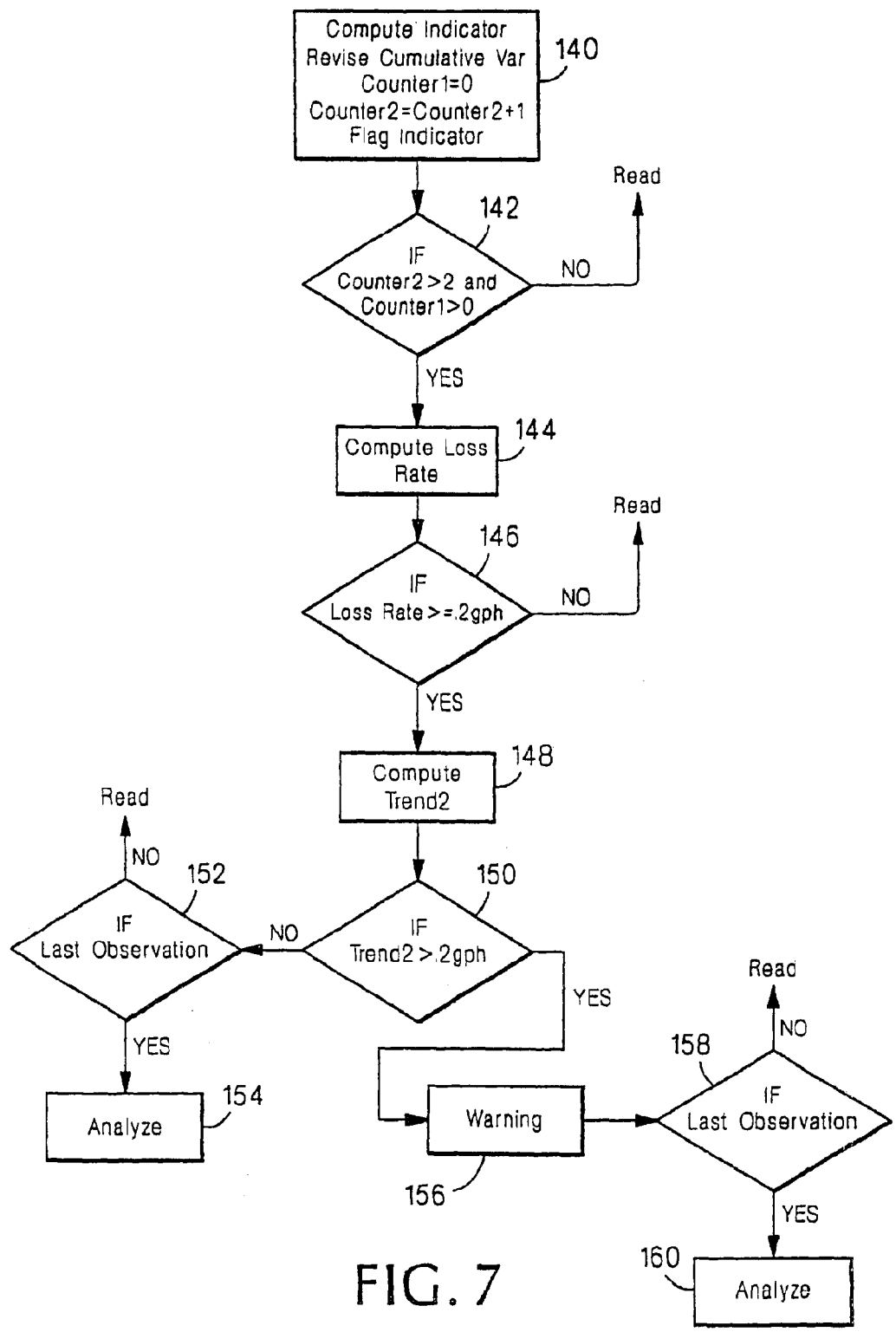

FIGS. 5, 6 and 7 show the routine operation procedure 100 followed by the software to perform this analysis. Data from the set-up of the system and the most recent analysis is entered into the program at step 102. The data entered includes the tank type, tank dimensions, tank tilt, meter calibrations, mean square error and calculated trends. At step 104, three variables established as counters, Counter1, Counter2, and Counter3, are set at zero. The measurement data from the system itself is entered at step 106, namely the readings from the dispenser totalizers, the product height and the product temperature.

The software computes the gross volume of the product, the most recent gross volume and the sales as measured by the individual dispensers at step 108. The software further manipulates the data at step 110 by converting all gross volumes to net volumes, computing observation to observation variance, and computing cumulative variance. The sign of the cumulative variance is recorded at step 112.

The program proceeds on the basis of the cumulative variance and the value of Counter1 in steps 114, 120, 124, 128, 132, 136 and 140. Depending on the cumulative variance and the value of Counter1, the program analyzes the collected data at step 118 if it is a final observation (step 116), deletes the collected data (steps 122 and 134), performs the analysis for a delivery (step 126) (see below), or reads new data (steps 116, 122, 130, 134, 138 and 142) upon updating the value of Counter1 and other computational variables (i.e. index, sign index and sign). In some cases, collected data is deleted (steps 122 and 134).

Upon computing the loss rate at step 144, the program reads new data at step 146 if the loss rate is not greater than or equal to, e.g., 0.2 gallon per hour, otherwise it computes the trend of the data at step 148. If at step 150 it is determined that the trend is greater than 0.2 gallon per hour, a warning is issued at step 156. In either case, the software continues to read and analyze the data at steps 152, 154, 158 and 160 until the last observation.

Figure 8:
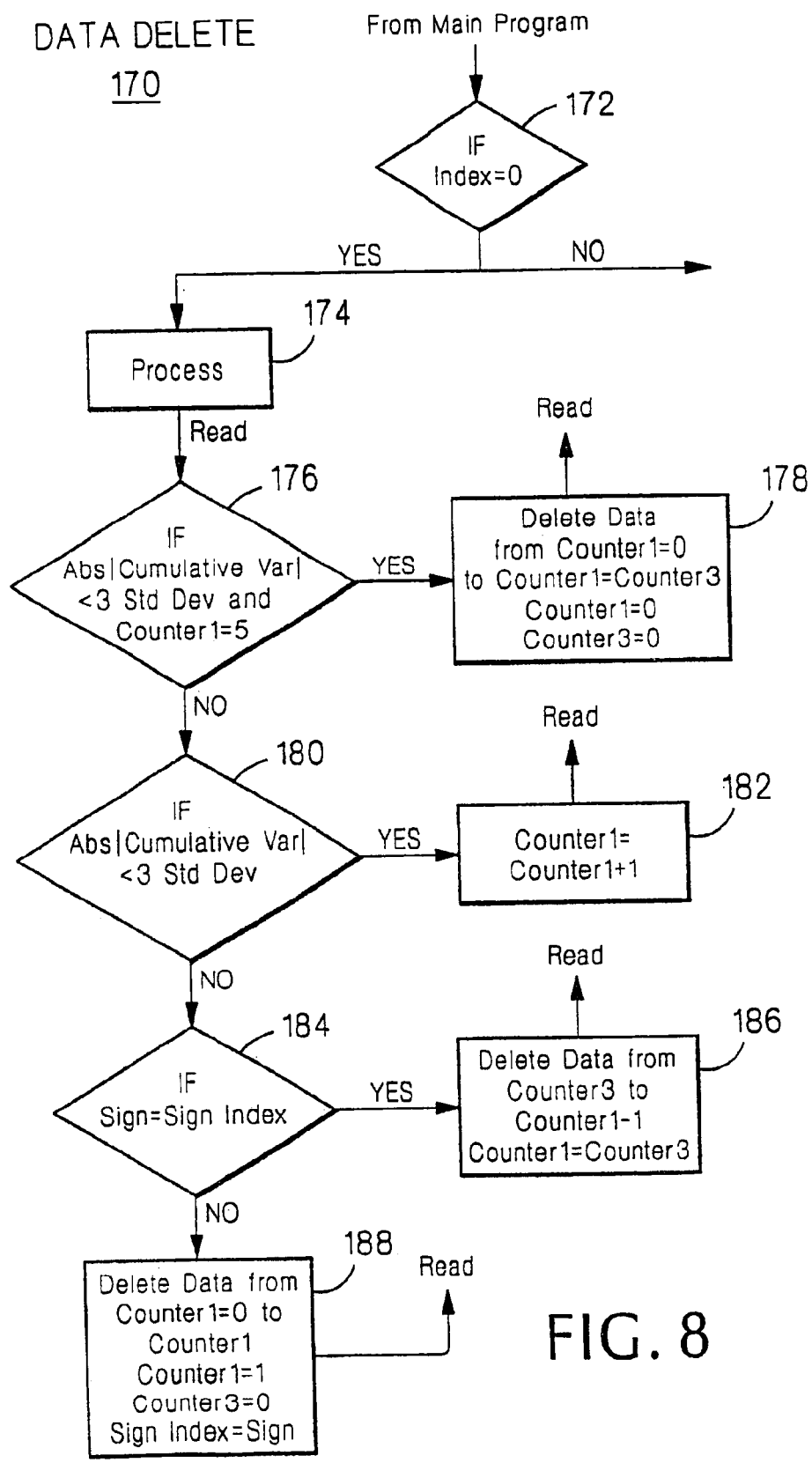
FIG. 8 is a block diagram of the steps performed during the data deletion operation of the algorithm of the present invention.

The operation of deleting data 170 is shown in detail in FIG. 8. After performing similar analyses at steps 172, 174, 176, 180 and 184, using the indices and the values of the calculated standard deviations as in the routine operation procedure described above, the values of the counters are updated and new data is read at steps 178, 182, 186 and 188. Data is deleted in accordance with steps 178, 186 and 188.

Figure 9:
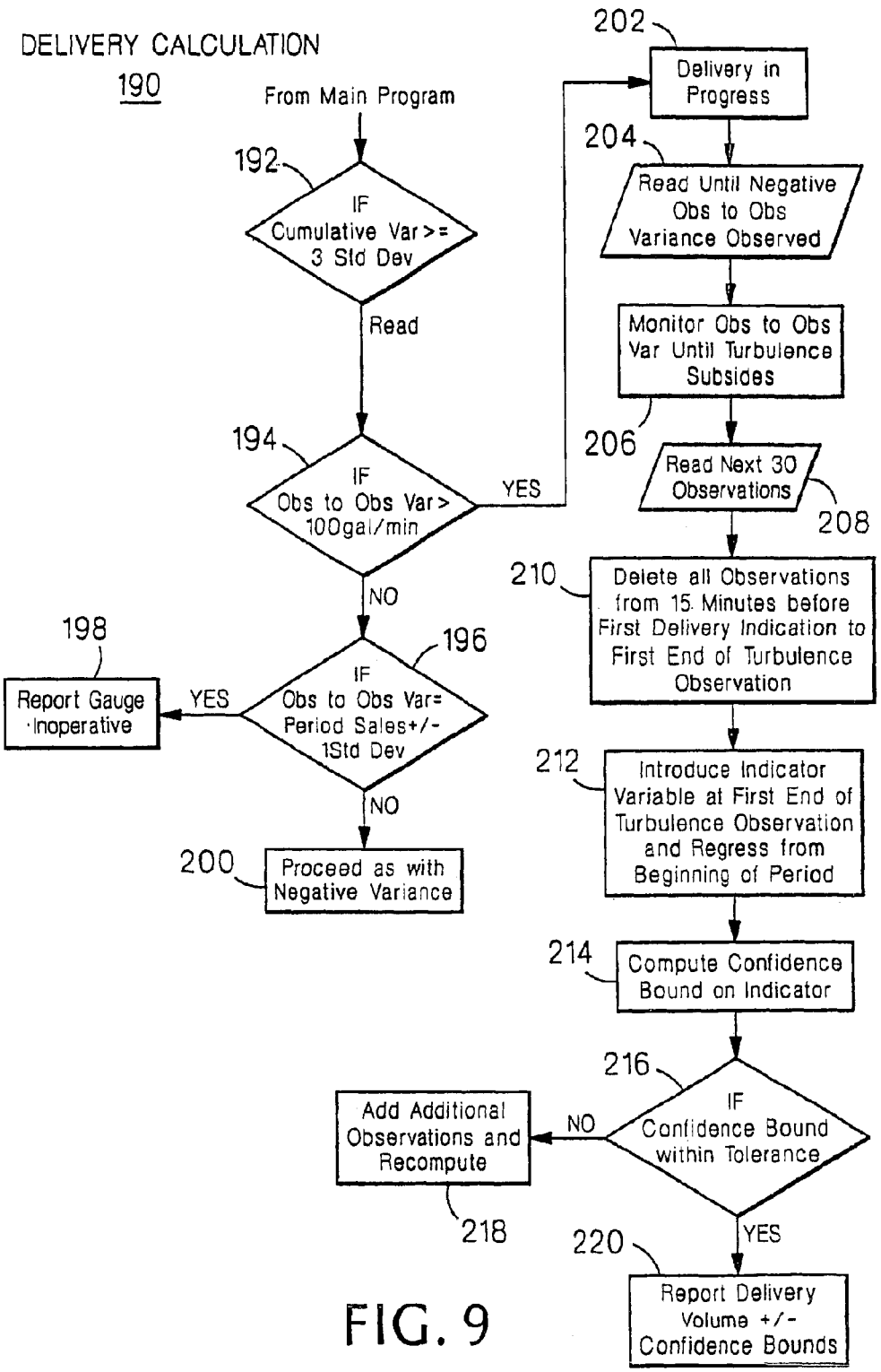
FIG. 9 is a block diagram of the steps performed during the delivery calculation operation of the algorithm of the present invention.

Finally, FIG. 9 shows the delivery calculation 190 in detail. After determining that the cumulative variance is greater than a predetermined value (three standard deviations) at step 192, the program determines whether the variance is greater than, e.g., 100 gallons per minute (step 194). If so, the delivery is recorded and the amount delivered is determined at steps 202 through 220.

If there is a delivery in progress (step 202), data is read until a negative observation to observation variance is observed (step 204). The variance is monitored until the turbulence in the tank subsides (step 206). Thirty observations are read (step 208), and all observations from 15 minutes before the delivery until the end of the turbulence observations are deleted (step 210). An indicator variable is introduced with the turbulence observation, from which regression commences (step 212). The confidence bound on the indicator is computed (step 214). If the confidence bound is within a predetermined tolerance, the volume of the delivery is reported within the confidence bounds (step 220); otherwise, additional observations are added, and the confidence bound is recomputed (step 218).

If the variance between data measurements is less than 100 gallons per minute, the software determines whether the gauges are inoperative and reports them as being inoperative (step 198), or proceeds as in the routine operation procedure according to step 200 (in which there is a negative variance)

depending on whether the observed variance exceeds a predetermined value (within one standard deviation) at step 196.

In general, if observed variances are within three standard deviations or other predetermined tolerance of the expected value, the data is stored for future analysis. When cumulative variance exceeds three standard deviations or other predetermined tolerance, different software programs are executed depending on the nature and magnitude of the department.

If within ten (or other predetermined) successive observations after the initial departure, the cumulative variance returns to within the tolerance range, all data from and including the initial departure and prior to the initial observation are deleted. The time extent and number of observations involved is recorded and stored for, e.g., a daily gauge performance report.

If all ten (or other predetermined) successive observations remain outside the tolerance bound and the cumulative variances are of the same sign, a new trend line is initiated at the point of initial departure. After ten (or other predetermined) additional observations, a third trend line is initiated. If the increment to the overall trend estimated from the most recent observations is not significant, the most recent data is consolidated with the previous data and the process is repeated until such time, if ever, that the current rend increment is significant.

If the departure is positive, the system checks whether the product is being dispensed and whether the gauge height fails to decrease, reflecting removal from tank. If so, the tank gauge is reported to be inoperative.

If the gauge height is increasing, monitoring is continued as above until the most recent trend line returns to its original slope. Minute to minute variances are monitored to detect turbulence until the gauge values again return to within tolerance. All observations which occurred in the fifteen minutes prior to the first positive departure until the end of post delivery turbulence are deleted. An indicator variable is introduced at the first observation after post delivery turbulence. The system collects thirty additional observations and performs the regression from the beginning of the period to determine the volume delivered. The volume delivered is then reported.

If the departure is negative, the system proceeds as with delivery. If successive slope increments fail to show a return to the original slope, indicating continuing loss of product for a predetermined period, typically one hour, and the slope exceeds 0.2 gallon per hour, the system reports a warning that there is a continuous loss of product. If the loss rate is less than 0.2 gallon per hour but greater than the minimum detectable leak, the system continues to monitor and recalculate the parameters, to be included in a daily operational report. If the incremental trend line shows a return to the original trend, the system proceeds as with delivery, introduces an indicator variable, deletes data as necessary, and performs the regression to determine the volume of product removed. The system reports a one-time removal of product.

Figure 10:
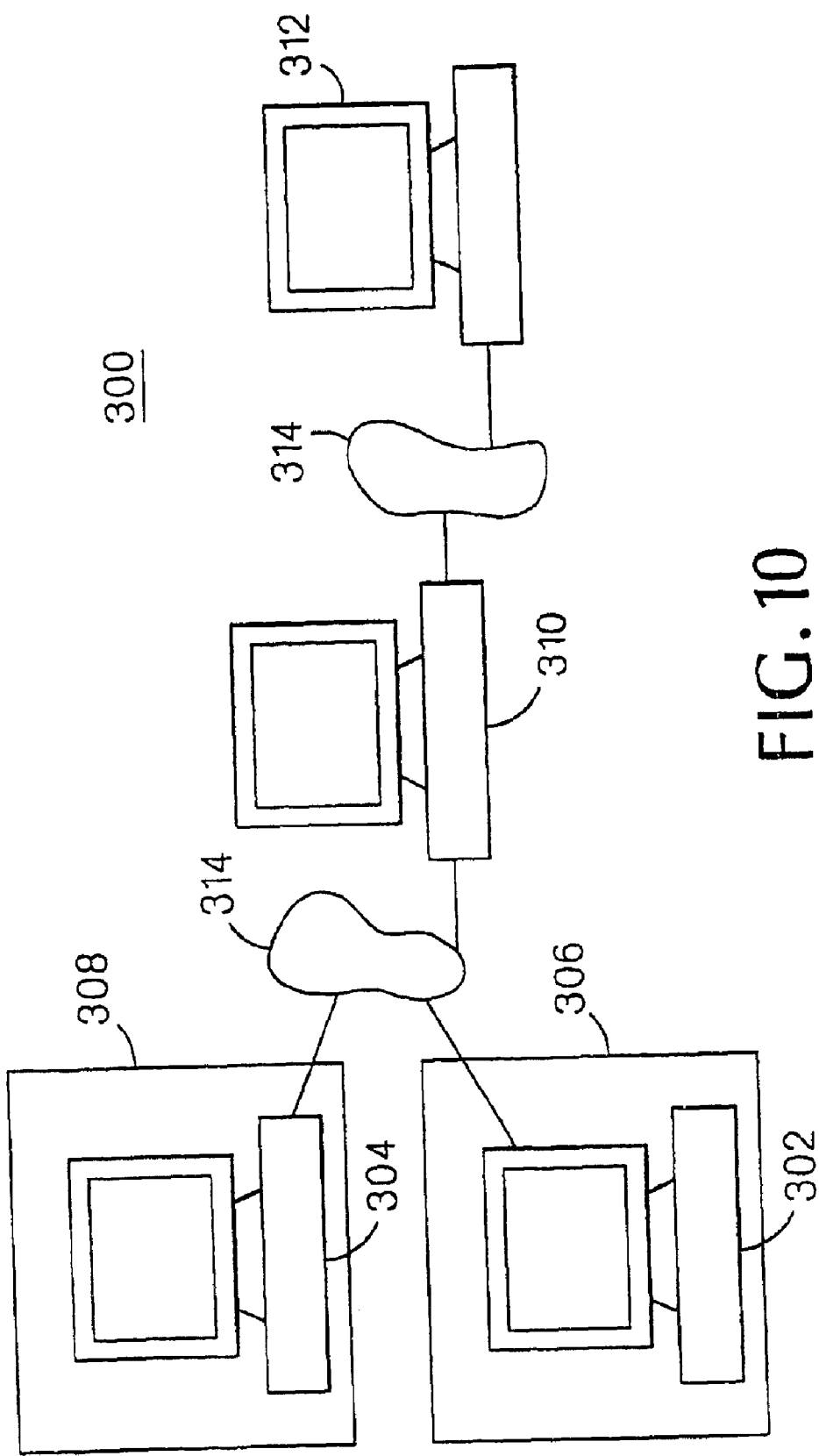
FIG. 10 is a schematic diagram of a data acquisition and transmission network that may be used in conjunction with the present invention.

Referring to FIG. 10, the invention incorporates a data acquisition and transmission network (DAT network) 300 to completely automate the process of obtaining, capturing, transferring and processing product inventory data for use in product management, delivery scheduling and environmental compliance practices. DAT network 300 includes on-site processors 302, 304 at the facilities 306, 308 where the tanks are located, a customer host processor 310 and a central host processor 312. DAT network 300 links multiple remote facilities 306, 308 to central host processor 312, which performs the SIR analysis. The link may be accomplished indirectly through customer host processor 310, which itself is connected to a plurality of remote facilities 306, 308. Each of these processor elements is composed of independently operating software and hardware systems which form the basis of a wide area network linked by modems which transmit information electronically via the telephone network 314 using standard dial-up voice grade telephone lines. Examples of DAT networks are the TeleSIRA and ECCO-SIRA systems developed by Warren Rogers Associates, Inc., Middletown, R.I. According to another embodiment, DAT network 300 may capture data wirelessly through, for example, PCS cellular, Bluetooth, 802.11, WiFi, Infrared, radio frequency or other wireless technology.

DAT network 300 provides a uniform method of integrated management for the widest possible variation of underground and above-ground fuel storage, movement, and measurement systems. On-site processors 302, 304 are capable of obtaining information from any electronic or mechanical control system, enabling DAT network 300 to accommodate facility configurations that are unique to each facility while presenting the information captured at remote facilities 306, 308 to customer host processor 310 or central host processor 312 in a uniform format.

On-line processors 302, 304 obtain and capture product inventory data through the use of proprietary interfaces with external systems in use at remote facility 306, 308, such as tank gauges and sales recording devices. On-line processors 302, 304 transfer captured information daily, weekly or monthly through the public switched telephone network 314 to customer host processor 310 or central host processor 312 for use in inventory management, delivery scheduling and/or environmental compliance. On-site processors 302, 304 may be, e.g., touch-tone telephones acting as sending units and Windows-based multi-line, voice prompt/response PC's as the receiving units. On-site processors 302, 304 may be designed to meet the specific needs of facilities 306, 308 without requiring remote hardware at the facility in addition to that already present.

In particular, each of on-site processors 302, 304 typically is equipped with an alphanumeric keypad, a character display, a power supply, four programmable serial communication ports, an internal auto-dial/auto-answer (AD/AA) modem and a local printer port (for connection to a printer). The keypad and display allow for operator configuration and manual entry of sales, delivery and tank level data. Use of an AD/AA 2400 baud modem allows multiple on-site processor 302, 304 to share an existing voice grade telephone line by establishing communication windows to minimize attempted simultaneous use. Each of the programmable serial communication ports is independent, fully programmable and governed by options selected at the facility or off-site through modem access. Finally, on-site processors 302, 304 can prompt the facility operator to enter missing or suspect entries when results are outside the expected range. According to another embodiment, on-site processors 302, 304 may capture data wirelessly through, for example, PCS cellular, Bluetooth, 802.11, WiFi, Infrared, radio frequency, or other wireless technology.

The use of customer host processor 310, which is capable of receiving, storing and processing information from multiple on-site processors 302, 304, enables the management of a remote tank population from a single point of contact. A database of information created by customer host processor 310 is the basis for all higher level product management functions performed by DAT network 300. The database is also the basis for the environmental compliance analysis performed by central host processor 312.

The use of central host processor 312, which is capable of receiving, storing and processing the information in the database created by customer host processor 310 for product management enables DAT network 300 to achieve maximum results by utilizing the database for environmental compliance without additional remote facility information or communication. Central host processor 312 is capable of transmitting a resulting database of the environmental analysis back to customer host processor 310 for printing and other customer record-keeping requirements.

The processor elements of DAT network 300 may exhibit other useful operational characteristics. To prevent unauthorized access to DAT network 300, a security access code for dial-up data transfer functions is required. Under secured access, the baud rate, parity, stop bit parameters and communication protocol are determined at any of on-site processors 302, 304, customer host processor 310 or central host processor 312.

Another function of DAT network 300 is to monitor tank contents generally. DAT network 300 can be programmed to activate, e.g., an audible and visual alarm if the water level in the tank is too high (e.g., greater than 2 inches), if the product level in the tank is too high (e.g., more than 90% of tank capacity) or too low (e.g., less than 10% of tank capacity, more product must be reordered, or less than two days supply), and if a theft occurs (product level changes during quiet periods).

The system may be used to obtain valuable information other than inventory regulation and leak detection. For example, the system may incorporate time series analysis routines, including Box Jenkins, moving average and exponential smoothing, to derive estimates of demand for the product which also incorporate temporal and seasonal trends and special events.

The demand analysis may also be combined with additional inputs of holding costs, reorder costs, transportation costs and penalty costs for running out of stock. The system can include optimal inventory algorithms to determine optimal order quantities, reorder points and optimal delivery truck routing. Further, the system may incorporate multiechelon, optimal inventory procedures to accommodate combined wholesale and retail operations, such as with calculus-based optimization and linear, nonlinear and dynamic programming.

Figure 13:
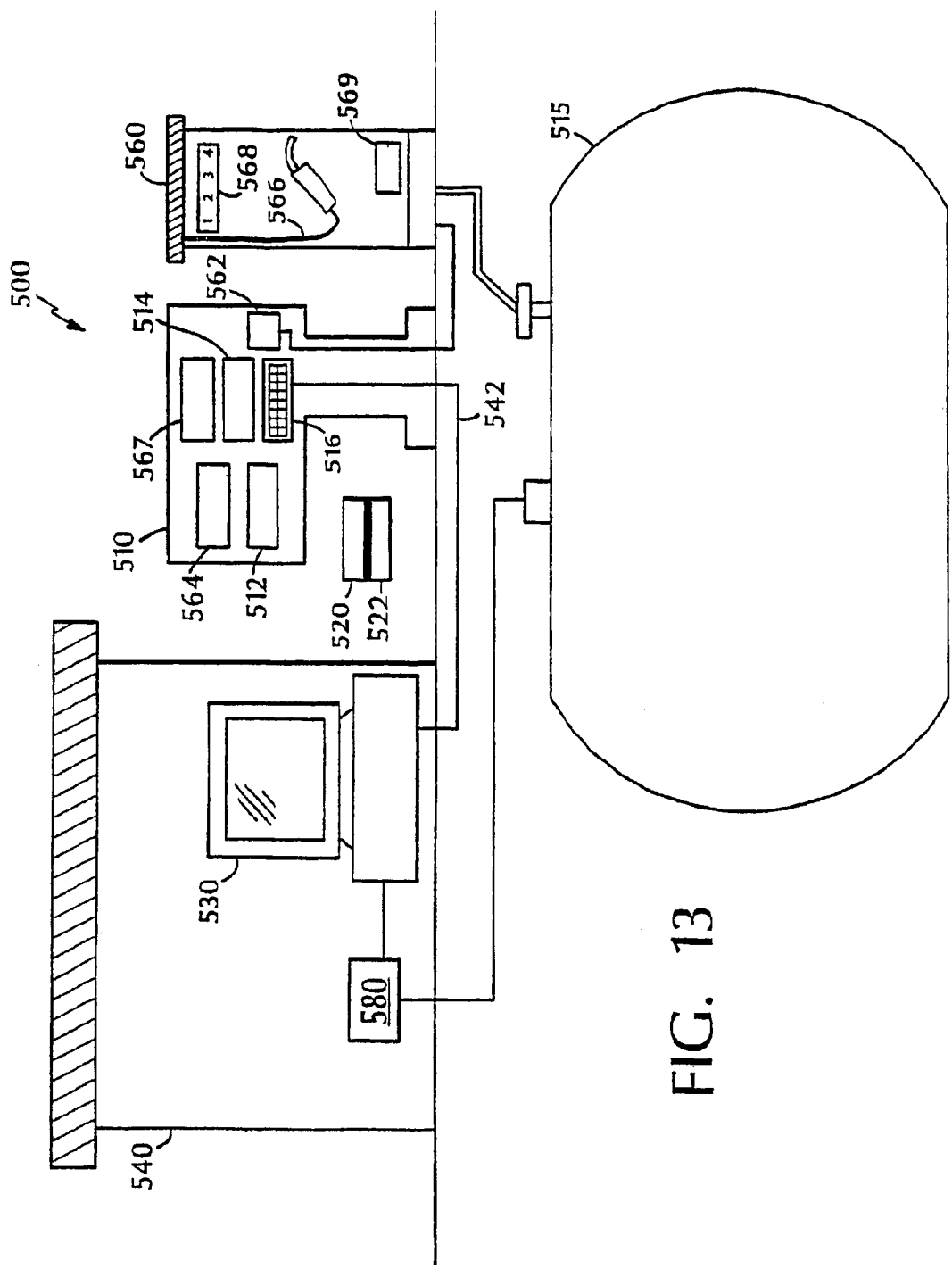
FIG. 13 is a schematic diagram of an underground storage tank facility including a fuel access control unit.

As shown in FIG. 13, a DAT network may include a fuel access control unit or system 510 at a storage tank facility 500 such as a UST automobile fueling facility. Fuel access control unit 510 is a dispensing system actuated by the use of a device coded with information, e.g., a card 520 with a coded magnetic stripe 522, e.g., an optical punched card, an electrically erasable programmable read-only memory (EEPROM) key, a radio frequency identification (RFID) tag, a magnetic resonance coupler, a bar code, or other type of coded medium which contains identification information pertaining to the user. Fuel access control unit 510 may include apparatus for a user to input information, e.g., a card reader 512, a display 514, and a keypad 516, a control system 562 for turning a fueling dispenser 560 on and off, and a processor 564 or similar computing platform for controlling and monitoring the user's fueling process. Manufacturers of fuel access control system which rely upon optical reading devices or magnetic stripe card reading devices to identify the user include FallRite, Fuel Master, Gasboy, PetroVend and Trak Engineering.

Fuel access control unit 510 is used to monitor the activity of fueling dispenser 560. Fueling dispenser 560 includes a hose 566 for dispensing fuel from a tank 515, a totalizer 568 and a meter 569 for measuring the volume of fuel dispensed by hose 566. Fuel access control unit 510 may communicate with an on-site processor 530 located inside facility building 540 over a local area network (LAN). The communications between fuel access control unit 510 and on-site processor 530 may be over RS-232/RS-485/RS-485 (MultiDrop) cabling 542. According to other embodiments, communications between fuel access control unit 510 and on-site processor 530 may occur wirelessly using, for example, PC, cellular, Bluetooth, 802.11, WiFi, Infrared, radio frequency, or other wireless technology.

Fuel access control unit 510 provides a system of controlling access to fueling facility 500 by determining the identity of each user of the facility and screening each user based on his or her authority to purchase fuel. Identification of the user is made by requiring the user to present a valid magnetic card (e.g., card 520), an optical punched card, an EEPROM key, an RFID tag, a magnetic resonance coupler, a bar code, or other type of coded medium, which contains identification information pertaining to the user. Such fuel access control systems are referred to as island control units or cardlock system. Further, the user may be required to present additional identifying data by other means such as buttons, key switches, or by entering information on keypad 516. Once the identification data is collected, fuel access control unit 510 determines the user's fueling privileges, and based on this information will either allow or deny fueling by the user. If fueling is allowed, fuel access control unit 510 will enable dispensing pump 560 for that particular user and monitor the fueling process. At the completion of the fueling process, fuel access control unit 510 will record the amount of the fueling transaction in a memory 567 and retain the recorded information for further accounting of the transaction.

Fuel access control until 510 may be used to perform a variety of functions, including the following:

1. Identifying the user by reading a card or other coded medium and collecting the user's identification information such as a driver license number or other personal data.
2. Collecting other pertinent data for analysis, such as an identification of the user's vehicle, the vehicle's odometer reading, a trip number, the trailer hub counter, the engine hour reading and/or a refrigerator unit hour reading.
3. Making authorization decisions, to determine whether the identified user is permitted to obtain fuel.
4. Enabling fueling by enabling the proper dispensing pump for the user.
5. Monitoring fueling by controlling the maximum amount dispensed.
6. Turning off the dispensing system if no fuel is dispensed for a predetermined period of time.
7. Recording the fueling transaction by storing the final amount of fuel dispensed.
8. Reporting the fueling transaction to a processing location for inventory analysis or other analysis.

There are two types of authorization procedures for determining whether an identified user is permitted to obtain fuel from a fueling facility. Fuel access control unit 510 may use either or both of these authorization procedures. For the first method of authorization, external authorization, fuel access control unit 510 collects the user's information and forwards the collected information to an outside agent to make a final decision as to whether or not the identified user is permitted to obtain fuel from fueling facility 500. The outside agent may return an approval, along with fueling parameters (i.e., a maximum amount), or a denial. Fuel access control unit 510 will then inform the user whether or not fuel may be obtained. The outside agent may be connected to fuel access control unit 510 via a dial-up telephone line, a LAN or a direct communication link.

For the second method of authorization, internal authorization, fuel access control until 510 collects the user's information and compares the collected information to a data table stored locally to make the final decision as to whether or not to allow fueling. The locally stored table may return an approval, along with fueling parameters (i.e., a maximum amount), or a denial. Fuel access control unit 510 will then inform the user whether or not fuel may be obtained. The locally stored table may be housed directly in fuel access control unit 510, in a control device at the fueling facility such as on-site processor 530 or carried on the access medium (e.g., card 520) used to request fueling authorization. The locally stored table may also be imbedded directly in fuel access control unit 510 or accessed via a LAN inside the fueling facility's building 540.

Fuel access control unit 510 functions as an additional point of sale (POS) device, similar to sales recording device 71 (FIG. 1). Fuel access control unit 510 responds to requests for hose status and totalizer and meter values in the same manner as a POS device. Fuel access control unit 510 also monitors each hose 566 and tracks status changes in the hose, including indications that the hose is idle, that a request for access is in process, that the use of hose 566 has been authorized, that the hose has been taken off its hook, that dispensing pump 560 is dispensing fuel with hose 566 removed from its hook, and that the dispensing pump has been turned off and the hose is idle again.

Each detailed transaction that is completed by fuel access control unit 510 may be retrieved by on-site processor 530 from memory 567 upon completion of the transaction. The transaction information may be stored in processor 530 for further analysis. Further, based on the stored, detailed transaction information, a detailed site dispensing audit can be performed. Such a site dispensing audit would determine whether the volume claimed to be dispensed by fuel access control unit 510 actually represents the volume change in the UST or AST during the same period as calculated by on-site processor 530.

In conventional cardlock applications as well as other transaction authorization procedures, the processing methods assume that the volume is determined by fuel access control unit 510 is accurate, but have no way of determining if any errors in calculating the volume have occurred. A fuel access control system interfaced directly with an on-site processor 530 that receives data from an automatic tank gauge 580 may also experience similar errors associated with conventional inventory control practices. By contrast, an enhanced, integrated fuel access control unit 510 may include an accurate analysis of the state of hose 566. Such an integrated fuel access control unit 510 may include an accurate analysis of the state of hose 566. Such an integrated fuel access control unit 510 may avoid the occurrence of dispensing pump 560 being properly accessed and enabled by authorization control system 562, but appearing not to be dispensing fuel. From the point of view of fuel access control unit 510, the user may have simply changed his mind about purchasing fuel. However, from the perspective of on-site processor 530, a determination can be made about the dispensing pump's activity by analyzing the tank activity and comparing that information to the activity of totalizer 568 and meter 569. Further, although other hoses may be actively dispensing fuel during the same period, on-site processor 530 may track all hose activity independently for analysis.

Other embodiments are within the scope of the claims.

What is claimed is:

1. A method of determining a volume of fluid associated with a fluid storage and dispensing system, the volume of fluid having a height in the system, the system comprising measurement apparatus for measuring the height, the method comprising:

collecting a plurality of height measurement data from the measurement apparatus in a form readable by a computer;

storing the plurality of height measurement data in a compressed matrix format in a computer memory; and performing regression analysis using the compressed matrix format to calculate the volume of fluid associated with the system.

2. The method of claim 1 wherein the collecting step is performed each time a portion of the volume of fluid is dispensed from the system.

3. The method of claim 1 wherein the collecting step includes transmitting the plurality of height measurement data to a host processor.

4. The method of claim 3 wherein transmitting the measurement data includes wireless transmission.

5. An apparatus for determining a volume of fluid associated with a fluid storage and dispensing system, the volume of fluid having a height in the system, the apparatus comprising:

measurement apparatus for measuring the height of the volume of fluid; and a computer comprising a processing means for collecting a plurality of height measurement data from the measurement apparatus and a memory for storing the plurality of height measurement data in a compressed matrix format;

wherein the processing means performs regression analysis on the compressed matrix format to determine the volume of fluid associated with the system.

6. A method of determining a plurality of volumes of fluid, each of the volumes associated with one of a plurality of fluid storage and dispensing systems, each of the volumes having a height in its associated system, each of the systems including measurement apparatus for measuring the height of each of the volumes of fluid, the method comprising:

collecting a plurality of height measurement data from the measurement apparatus of each of the plurality of systems in a form readable by a computer;

storing the plurality of height measurement data in a compressed matrix format in a computer memory; and performing regression analysis using the compressed matrix format to calculate the volumes of fluid associated with the systems.

\* \* \* \* \*